United States Patent
Ardo et al.

(10) Patent No.: US 12,230,486 B2
(45) Date of Patent: *Feb. 18, 2025

(54) RATCHET-BASED ION PUMPING MEMBRANE SYSTEMS

(71) Applicant: THE REGENTS OF THE UNIVERSITY OF CALIFORNIA, Oakland, CA (US)

(72) Inventors: Shane Ardo, Irvine, CA (US); Gideon Segev, Berkeley, CA (US); Francesca Toma, Berkeley, CA (US); Joel Ager, Berkeley, CA (US); Rylan Kautz, Irvine, CA (US); David Larson, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1122 days.

This patent is subject to a terminal disclaimer.

(21) Appl. No.: 16/907,076

(22) Filed: Jun. 19, 2020

(65) Prior Publication Data
US 2020/0402782 A1     Dec. 24, 2020

Related U.S. Application Data

(60) Provisional application No. 62/863,761, filed on Jun. 19, 2019.

(51) Int. Cl.
*H01J 41/00* (2006.01)
*B01D 61/46* (2006.01)
(Continued)

(52) U.S. Cl.
CPC ............ *H01J 41/12* (2013.01); *B01D 61/463* (2022.08); *C02F 1/4693* (2013.01); *B01D 2313/365* (2013.01); *C02F 2103/08* (2013.01)

(58) Field of Classification Search
CPC ... H01J 41/12; B01D 61/46; B01D 2313/365; C02F 1/4693; C02F 2103/08
See application file for complete search history.

(56) References Cited

U.S. PATENT DOCUMENTS

| | | |
|---|---|---|
| 3,784,457 A | 1/1974 | Mizutani et al. |
| 4,766,161 A | 8/1988 | Chlanda et al. |
| (Continued) | | |

FOREIGN PATENT DOCUMENTS

| | | |
|---|---|---|
| CN | 1443091 A | 9/2003 |
| CN | 109937462 A | 6/2019 |
| (Continued) | | |

OTHER PUBLICATIONS

Kedem, et al. "Cooperative Transport in a Multi-Particle, Multi-Dimensional Flashing Ratchet." The Journal of Physical Chemistry C 123.11 (Feb. 27, 2019): 6913-6921. Entire Document.
(Continued)

*Primary Examiner* — Zulmariam Mendez
(74) *Attorney, Agent, or Firm* — NGUYEN TARBET IP LAW

(57) ABSTRACT

Described herein is an ion pump system implementing an electronic ratchet mechanism produced by modulating a spatially varying electric potential distribution that can result in a net ionic current and voltage. The ion pumping membrane system includes an ion-permeable layer integrated with ion-selective membranes. The electric potential distribution within the ion-permeable layer is modulated through external stimuli. When immersed in solution, ions within the ion-permeable layer experience a time varying, spatially asymmetric electric field distribution resulting in ratchet-driven direction pumping, which can be used in applications such as desalination.

20 Claims, 15 Drawing Sheets
(15 of 15 Drawing Sheet(s) Filed in Color)

(51) Int. Cl.
  *C02F 1/469* (2023.01)
  *H01J 41/12* (2006.01)
  *C02F 103/08* (2006.01)

(56) References Cited

U.S. PATENT DOCUMENTS

| | | | |
|---|---|---|---|
| 6,274,806 | B1 | 8/2001 | Sugihara et al. |
| 6,878,287 | B1 | 4/2005 | Marais |
| 8,764,957 | B2 | 7/2014 | Sui et al. |
| 2007/0099055 | A1 | 5/2007 | Lee et al. |
| 2008/0213641 | A1 | 9/2008 | Ostermann et al. |
| 2010/0143811 | A1 | 6/2010 | Brimblecombe et al. |
| 2011/0088757 | A1 | 4/2011 | Highgate et al. |
| 2012/0097541 | A1 | 4/2012 | Yazdanbod |
| 2012/0309045 | A1 | 12/2012 | Knutson et al. |
| 2012/0312737 | A1 | 12/2012 | Miller |
| 2013/0041353 | A1 | 2/2013 | Shin et al. |
| 2013/0168228 | A1 | 7/2013 | Ozin et al. |
| 2015/0298100 | A1 | 10/2015 | Hill et al. |
| 2016/0067669 | A1 | 3/2016 | Willey et al. |
| 2016/0158690 | A1 | 6/2016 | Puxty et al. |
| 2016/0310899 | A1 | 10/2016 | Bordain et al. |
| 2017/0320053 | A1 | 11/2017 | Moon et al. |
| 2017/0373335 | A1* | 12/2017 | Aetukuri ............ B01D 53/32 |
| 2018/0065095 | A1 | 3/2018 | Ardo et al. |
| 2018/0145271 | A1 | 5/2018 | Kedem et al. |
| 2019/0134570 | A1 | 5/2019 | Pintauro et al. |

FOREIGN PATENT DOCUMENTS

| | | |
|---|---|---|
| JP | H07241443 A | 9/1995 |
| JP | 2001247546 A | 9/2001 |
| JP | 2009234934 A | 10/2009 |
| JP | 2015530238 A | 10/2015 |
| WO | WO2018049061 A1 | 3/2018 |
| WO | WO0205933 A1 | 1/2022 |

OTHER PUBLICATIONS

Kedem, et al. "How to drive a flashing electron ratchet to maximize current." Nano letters 17 9 (Sep. 13, 2017): 5848-5854.
Ramirez et al. "Current-voltage curves of bipolar membranes." Journal of applied physics 72.1 (1992): 259-264.
Mafé et al. "Electric field-assisted proton transfer and water dissociation at the junction of a fixed-charge bipolar membrane." Chemical Physics Letters 294.4-5 (1998): 406-412.
Mafe et al. "Electrochemical characterization of polymer ion-exchange bipolar membranes." Acta polymerica 48.7 (1997): 234-250.
Email communication from ProQuest to Examiner Raphael, Nov. 3, 2020 (Year: 2020) 1 page.
Gopidas et al. "Photochemistry in polymers: photoinduced electron transfer between phenosafranine and triethylamine in perfluorosulfonate membrane." Journal of Physical Chemistry 94.11 (1990): 4723-4727.
Johns et al. "Visible light activated ion sensing using a photoacid polymer for calcium detection." Analytical chemistry 86.13 (2014): 6184-6187.
Mohan et al. "Photochemical behaviour of rhodamine 6G in Nafion membrane." Journal of the Chemical Society, Faraday Transactions 88.1 (1992): 41-45.
Krishnan et al. "Integrated chemical systems: photocatalysis at semiconductors incorporated into polymer (Nafion)/mediator systems." Journal of the American Chemical Society 105.23 (1983): 7002-7003.
Mistlberger et al. "Photoresponsive ion extraction/release systems: dynamic ion optodes for calcium and sodium based on photochromic spiropyran." Analytical chemistry 85.5 (2013): 2983-2990.
O'Donnell et al. "Photoacidic and photobasic behavior of transition metal compounds with carboxylic acid group (s)." Journal of the American Chemical Society 138.11 (2016): 3891-3903.

Lovrecek et al. "Electrolytic junctions with rectifying properties." The Journal of Physical Chemistry 63.5 (1959): 750-751.
Maslov et al. "Water as a Semiconductor." Russian Chemical Reviews 37.4 (1968): 310.
Murphy, G. W. "Model systems in photoelectrochemical energy conversion." Solar Energy 21.5 (1978): 403-407.
Pearson et al. "Electrical properties of pure silicon and silicon alloys containing boron and phosphorus." Physical Review 75.5 (1949): 865.
Roses et al. "Autoprotolysis in aqueous organic solvent mixtures." Analytical Chemistry 65.17 (1993): 2294-2299.
Rondinini et al. "Autoprotolysis constants in nonaqueous solvents and aqueous organic solvent mixtures." Pure and Applied Chemistry 59.12 (1987): 1693-1702.
Battaglia et al. "High-efficiency crystalline silicon solar cells: status and perspectives." Energy & Environmental Science 9.5 (2016): 1552-1576.
Shockley et al. "Detailed balance limit of efficiency of p—n junction solar cells." Journal of applied physics 32.3 (1961): 510-519.
Astom Corporation, "Comparison table for detailed specification of Cation/Anion Exchange Membrane". 2013, 1 page; http://www.astom-corp.jp/en/product/images/astom_hyo.pdf.
Tran et al. "The United Nations World Water Development Report, 2016: Water and Jobs: Facts and Figures." 2016, 12 pages.
Worldbank, "Water Overview" 2017, 3 pages; http://www.worldbank.org/en/topic/water/overview.
Ardo, S. Development of a Plastic Water Bottle for Sunlight-Driven Desalination. Distinctive Voices Lecture Series; National Academy of Sciences, 2017, 1 page; https://www.youtube.com/watch?v=F3h41nPIjXY.
World Health Organization, "Total Dissolved Solids in Drinking-Water" Heal. criteria other Support. Inf. (1996) 8 pages.
Bell System Solar Battery Converts Sun's Ray into Electricity! Look Magazine. 1956, 1 page.
Haussener et al. "Modeling, simulation, and design criteria for photoelectrochemical water-splitting systems." Energy & Environmental Science 5.12 (2012): 9922-9935.
Hu et al. "An analysis of the optimal band gaps of light absorbers in integrated tandem photoelectrochemical water-splitting systems." Energy & Environmental Science 6.10 (2013): 2984-2993.
Xiang et al. "Modeling, simulation, and implementation of solar-driven water-splitting devices." Angewandte Chemie International Edition 55.42 (2016): 12974-12988.
Chandran et al. "Evaluating particle-suspension reactor designs for Z-scheme solar water splitting via transport and kinetic modeling." Energy & Environmental Science 11.1 (2018): 115-135.
Keene et al. "Calculations of theoretical efficiencies for electrochemically-mediated tandem solar water splitting as a function of bandgap energies and redox shuttle potential." Energy & Environmental Science 12.1 (2019): 261-272.
Wang et al. "Scalable water splitting on particulate photocatalyst sheets with a solar-to-hydrogen energy conversion efficiency exceeding 1%." Nature materials 15.6 (2016): 611-615.
Fabian et al. "Particle suspension reactors and materials for solar-driven water splitting." Energy & Environmental Science 8.10 (2015): 2825-2850.
Goto et al. "A particulate photocatalyst water-splitting panel for large-scale solar hydrogen generation." Joule 2.3 (2018): 509-520.
Eisler et al. "Multijunction solar cell efficiencies: effect of spectral window, optical environment and radiative coupling." Energy & Environmental Science 7.11 (2014): 3600-3605.
Tiedje et al. "Limiting efficiency of silicon solar cells." IEEE Transactions on electron devices 31.5 (1984): 711-716.
Chuang et al. "Open-circuit voltage deficit, radiative sub-bandgap states, and prospects in quantum dot solar cells." Nano letters 15.5 (2015): 3286-3294.
Swarnkar et al. "Quantum dot-induced phase stabilization of a-CsPbI3 perovskite for high-efficiency photovoltaics." Science 354.6308 (2016): 92-95.
Yang et al. "High-performance photovoltaic perovskite layers fabricated through intramolecular exchange." Science 348.6240 (2015): 1234-1237.

(56) References Cited

OTHER PUBLICATIONS

Kulkarn et al. "Band-gap tuning of lead halide perovskites using a sequential deposition process." Journal of Materials Chemistry A 2.24 (2014): 9221-9225.
Wikipedia, "Silicon". Oct. 28, 2018, . p. 1-3.
Balster et al. "Tailoring the interface layer of the bipolar membrane." Journal of membrane science 365.1-2 (2010): 389-398.
Wilhelm, Friedrich G. "Bipolar membrane electrodialysis." University of Twente (2001) 242 pages.
Zhang et al. ""Uphill" cation transport: a bioinspired photo-driven ion pump." Science advances 2.10 (2016): e1600689.
Mei et al. "Gate modulation of proton transport in a nanopore." Physical Chemistry Chemical Physics 18.10 (2016): 7449-7458.
Tributsch, Helmut. "Light driven proton pumps." Ionics 6.3 (2000): 161-171.
Steinberg-Yfrach, et al. "Conversion of light energy to proton potential in liposomes by artificial photosynthetic reaction centres." Nature 385.6613 (1997): 239-241.
Xie et al. "Supplementary Information, Photocurrent generation based on a light-driven proton pump in an artificial iquid membrane." Nature chemistry 6.3 (2014): 15 pages.
Sun et al. "A simple light-driven transmembrane proton pump." Proceedings of the National Academy of Sciences 93.20 (1996): 10758-10762.
Kolbe, Michael, et al. "Structure of the light-driven chloride pump halorhodopsin at 1.8 Å resolution." Science 288.5470 (2000): 1390-1396.
White et al. "Conversion of visible light into ionic power using photoacid-dye-sensitized bipolar ion-exchange membranes." Joule 2.1 (2018): 94-109.
Reiter, Ronald. Electrochemical Evaluation of Bipolar Ion-Exchange Membranes for Solar Fuels. Diss. UC Irvine, 2015.
Chambers et al. "Efficient photochemical dihydrogen generation initiated by a bimetallic self-quenching mechanism." Journal of the American Chemical Society 138.41 (2016): 13509-13512.
Stewart et al. "Accelerating slow excited state proton transfer." Proceedings of the National Academy of Sciences 110.3 (2013): 876-880.
Mauzerall et al. "A simple light-driven transmembrane proton pump." Proceedings of the National Academy of Sciences 93.20 (1996): 10758-10762.
Murphy, "Model systems in photoelectrochemical energy conversion." Solar Energy 21.5 (1978): 403-407.
Sanborn et al. "Photoelectrochemical Ion Pumping with Dye-Functionalized Polymer Membranes." ECS Meeting Abstracts. No. 37. IOP Publishing, 2015.
White et al. "Sunlight-Driven Ionic Power Generation from Bipolar Ion-Exchange Membranes Functionalized with Photoacids." ECS Meeting Abstracts. No. 38. IOP Publishing, 2016.
White et al. "Observation of photovoltaic action from photoacid-modified nafion due to light-driven ion transport." Journal of the American Chemical Society 139.34 (2017): 11726-11733.
Li et al. "Comb-shaped polymers to enhance hydroxide transport in anion exchange membranes." Energy & Environmental Science 5.7 (2012): 7888-7892.
Wang et al. "Alkaline stability of poly (phenylene oxide) based anion exchange membranes containing imidazolium cations." Journal of The Electrochemical Society 163.8 (2016): F824.
Lashkaryov,. "Investigations of a barrier layer by the thermoprobe method." Izv. Akad. Nauk SSSR, Ser. Fiz 5.4-5 (1941): 442-446.
Fuller, "Some analogies between semiconductors and electrolyte solutions." Rec. Chem. Prog 17.2 (1956): 75-93.
Chapin et al. "A new silicon pn junction photocell for converting solar radiation into electrical power." Semiconductor Devices: Pioneering Papers. 1991. 969-970.
Würfel, P. "Physics of solar cells: From principles to new concepts. Verlag Gmbh & Co KGaA." (2005), 188 pages.
Wurthner et al. "J-aggregates: from serendipitous discovery to supramolecular engineering of functional dye materials." Angewandte Chemie International Edition 50.15 (2011): 3376-3410.
Ardo, et al. "Excited-state electron transfer from ruthenium-polypyridyl compounds to anatase TiO2 nanocrystallites: evidence for a stark effect." The Journal of Physical Chemistry B 114.45 (2010): 14596-14604.
Ardo et al. "Stark effects after excited-state interfacial electron transfer at sensitized TiO2 nanocrystallites." Journal of the American Chemical Society 132.19 (2010): 6696-6709.9.
Pensack et al. "Ultrafast vibrational spectroscopy of charge-carrier dynamics in organic photovoltaic materials." Physical Chemistry Chemical Physics 11.15 (2009): 2575-2591.
Zhang et al. "Imidazolium functionalized polysulfone anion exchange membrane for fuel cell application." Journal of Materials Chemistry 21.34 (2011): 12744-12752.
Wang et al. "Preparation of alkaline anion exchange membranes based on functional poly (ether-imide) polymers for potential fuel cell applications." Journal of Membrane Science 326.1 (2009): 4-8.
Luo et al. "Diffusion dialysis of hydrochloride acid at different temperatures using PPO-SiO2 hybrid anion exchange membranes." Journal of Membrane Science 347.1-2 (2010): 240-249.
Khan et al. "Development of BPPO-based anion exchange membranes for electrodialysis desalination applications." Desalination 391 (2016): 61-68.
Merle et al. "Anion exchange membranes for alkaline fuel cells: A review." Journal of Membrane Science 377.1-2 (2011): 1-35.
Reiter et al. "Communication-electrochemical characterization of commercial bipolar membranes under electrolyte conditions relevant to solar fuels technologies." Journal of The Electrochemical Society 163.4 (2016): H3132.
Ünlü et al. "Hybrid anion and proton exchange membrane fuel cells." The Journal of Physical Chemistry C 113.26 (2009): 11416-11423.
Grew et al. "Understanding transport at the acid-alkaline interface of bipolar membranes." Journal of The Electrochemical Society 163.14 (2016): F1572.
Warrick et al. "Viscosity effects on ion-recombination kinetics. Bromocresol green in water-glycerol mixtures." The Journal of Physical Chemistry 76.8 (1972): 1184-1191.
Hegedus et al. "Electrolyte transistors: ionic reaction-diffusion systems with amplifying properties." The Journal of Physical Chemistry A 102.32 (1998): 6491-6497.
Spry et al. "Proton transfer and proton concentrations in protonated Nafion fuel cell membranes." The Journal of Physical Chemistry B 113.30 (2009): 10210-10221.
Eames et al. "Ionic transport in hybrid lead iodide perovskite solar cells." Nature communications 6.1 (2015): 1-8.
Bag et al. "Kinetics of ion transport in perovskite active layers and its implications for active layer stability." Journal of the American Chemical Society 137.40 (2015): 13130-13137.
Fabian et al. "Hybrid organic-inorganic solar cells based on bismuth iodide and 1, 6-hexanediammonium dication." Journal of Materials Chemistry A 4.18 (2016): 6837-6841.
Chen et al. "Spectral properties and dynamics of gold nanorods revealed by EMCCD-based spectral phasor method." Microscopy research and technique 78.4 (2015): 283-293.
Sahiner, Nurettin, and Selin Sagbas. "The preparation of poly (vinyl phosphonic acid) hydrogels as new functional materials for in situ metal nanoparticle preparation." Colloids and Surfaces A: Physicochemical and Engineering Aspects 418 (2013): 76-83.
Pekel, N., and O. Güven. "Investigation of complex formation between poly (N-vinyl imidazole) and various metal ions using the molar ratio method." Colloid and Polymer Science 277 (1999): 570-573.
James et al. "Voltage-gated ion transport through semiconducting conical nanopores formed by metal nanoparticle-assisted plasma etching." Nano letters 12.7 (2012): 3437-3442.
Guan et al. "Field-effect reconfigurable nanofluidic ionic diodes." Nature communications 2.1 (2011): 1-8.
Guan et al. "Voltage gated ion and molecule transport in engineered nanochannels: theory, fabrication and applications." Nanotechnology 25.12 (2014): 122001.
Ardo et al. "Systems and methods for integrated solar photodialysis." U.S. Appl. No. 16/367,102. 2019.

(56) References Cited

OTHER PUBLICATIONS

Xiao et al. "Artificial light-driven ion pump for photoelectric energy conversion." Nature communications 10.1 (2019): 1-7.
Xie et al. "Photocurrent generation based on a light-driven proton pump in an artificial liquid membrane." Nature chemistry 6.3 (2014): 202-207.
Siwy et al. "Fabrication of a synthetic nanopore ion pump." Physical Review Letters 89.19 (2002): 198103.
Siwy et al. "A nanodevice for rectification and pumping ions." American Journal of Physics 72.5 (2004): 567-574.
Sanborn et al. "Interfacial and nanoconfinement effects decrease the excited-state acidity of polymer-bound photoacids." Chem 5.6 (2019): 1648-1670.
Kedem et al. "How to drive a flashing electron ratchet to maximize current." Nano letters 17.9 (2017): 5848-5854.
Tarlie et al. "Optimal modulation of a Brownian ratchet and enhanced sensitivity to a weak external force." Proceedings of the National Academy of Sciences 95.5 (1998): 2039-2043.
Kedem et al. "Mechanisms of Symmetry Breaking in a Multidimensional Flashing Particle Ratchet." ACS nano 11.7 (2017): 7148-7155.
Kedem et al. "Light-responsive organic flashing electron ratchet." Proceedings of the National Academy of Sciences 114.33 (2017): 8698-8703.
Yan et al. "The balance of electric field and interfacial catalysis in promoting water dissociation in bipolar membranes." Energy & Environmental Science 11.8 (2018): 2235-2245.
Lau et al. "An introduction to ratchets in chemistry and biology." Materials Horizons 4.3 (2017): 310-318.
Lehmann, V. "The physics of macropore formation in low doped n-type silicon." Journal of the Electrochemical Society 140.10 (1993): 8 pages.
Kedem et al. "Cooperative Transport in a Multi-Particle, Multi-Dimensional Flashing Ratchet." The Journal of Physical Chemistry C 123.11 (2019): 6913-6921.
United Nations, "Water Scarcity", accessed Mar. 31, 2022; 5 pages.
Li et al. "Solar assisted sea water desalination: A review." Renewable and Sustainable Energy Reviews 19 (2013): 136-163.
Liu et al. "Experimental analysis of a portable atmospheric water generator by thermoelectric cooling method." Energy Procedia 142 (2017): 1609-1614.
Swiss Water Tech Research & Development, "Atmosphere Water Generator (AWG)" accessed Mar. 31, 2022, 6 pages.
U.S. Energy Information Administration, "Use of energy explained Energy use in homes" (2021) 5 pages.
U.S. Energy Information Administration, "Space heating and water heating account for nearly two thirds of U.S. home energy use" (2018) 3 pages.
U.S. Energy Information Administration, "Heating and cooling no longer majority of U.S. home energy use" (2013) 2 pages.
Nemova et al. "Laser cooling of solids." Reports on Progress in Physics 73.8 (2010): 086501.
Sheik-Bahae et al. "Optical refrigeration." nature photonics 1.12 (2007): 693-699.
Zhang et al. "Laser cooling of a semiconductor by 40 kelvin." Nature 493.7433 (2013): 504-508.
Seletskiy et al. "Laser cooling of solids to cryogenic temperatures." Nature Photonics 4.3 (2010): 161-164.
Santhanam et al. "Thermoelectrically pumped light-emitting diodes operating above unity efficiency." Physical Review Letters 108.9 (2012): 097403.
Chen et al. "High-performance near-field electroluminescent refrigeration device consisting of a Gas light emitting diode and a Si photovoltaic cell." Journal of Applied Physics 122.14 (2017): 143104.
Xiao et al. "Electroluminescent refrigeration by ultra-efficient GaAs light-emitting diodes." Journal of Applied Physics 123.17 (2018): 173104.
Zhao et al. "Self-sustaining thermophotonic circuits." Proceedings of the National Academy of Sciences 116.24 (2019): 11596-11601.
Lin et al. "Near-field enhancement of thermoradiative devices." Journal of Applied Physics 122.14 (2017): 143102.
U.S. Environmental Protection Agency, "How We Use Water" accessed Mar. 31, 2022, 9 pages.
SunPower Corporation, "Solar Panels Based on Maxeon Solar Cell Technology" accessed Mar. 31, 2022, 7 pages.
Brackmann, "Laser Dyes" 3rd edition, (2000) 294 pages.
Luxottica / Exciton, "Laser Dyes" accessed Mar. 31, 2022, 11 pages.
Li et al. "Combined theoretical and experimental study of band-edge control of Si through surface functionalization." The Journal of Physical Chemistry C 117.10 (2013): 5188-5194.
Mongin et al. "Thermally activated delayed photoluminescence from pyrenyl-functionalized CdSe quantum dots." Nature Chemistry 10.2 (2018): 225-230.
Lewis, Nathan S. "A Quantitative Investigation of the Open-Circuit Photovoltage at the Semiconductor/Liquid Interface." Journal of The Electrochemical Society 131.11 (1984): 2496.
Grimm et al. "Comparison of the photoelectrochemical behavior of H-terminated and methyl-terminated Si (111) surfaces in contact with a series of one-electron, outer-sphere redox couples in CH3CN." The Journal of Physical Chemistry C 116.44 (2012): 23569-23576.
Optical Properties of Silicon'. PVEDUCATION, May 25, 2018 {May 25, 2018). p. 1-3. [retrieved 27 4.9 Mar. 2, 2020 [Mar. 27, 2020) from<https:web.archive.org web/20 180525182157/https:Www. pveducation .org/pvcdrom/.
Seletskiy et al. "Local laser cooling of Yb: YLF to 110 K." Optics express 19.19 (2011): 18229-18236.
Yu et al. "Fundamental mechanisms of electroluminescence refrigeration in heterostructure light-emitting diodes." Light-Emitting Diodes: Research, Manufacturing, and Applications XI. vol. 6486. SPIE, 2007.

\* cited by examiner

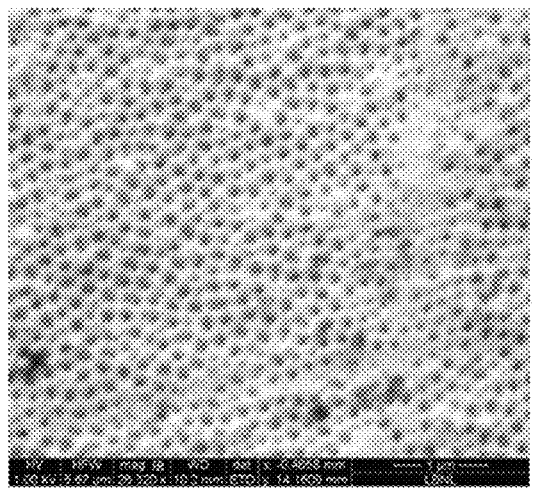 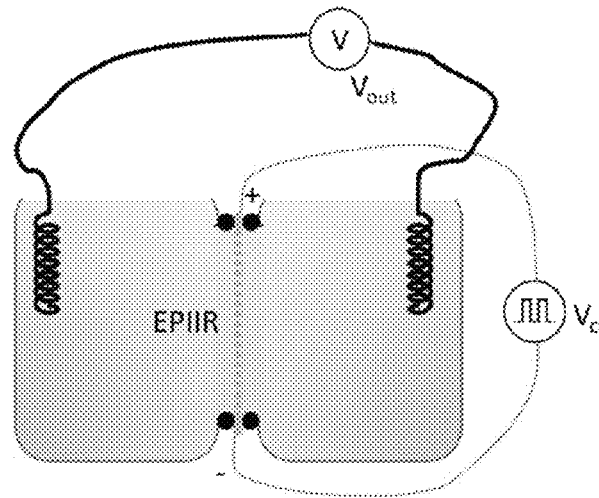
FIG. 6A    FIG. 6B
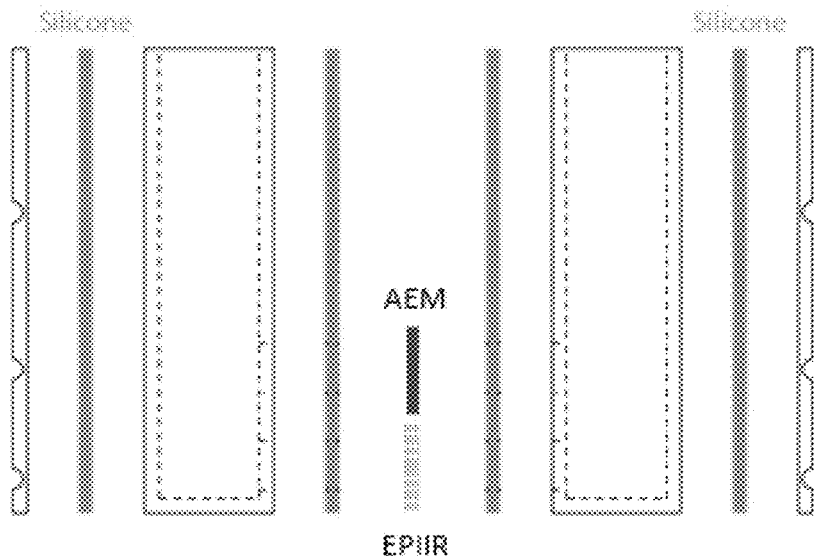
FIG. 6C

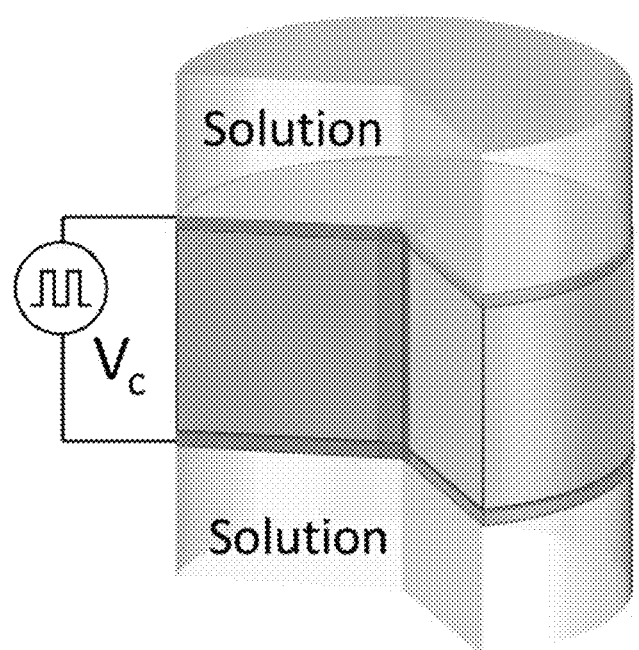
FIG. 9A
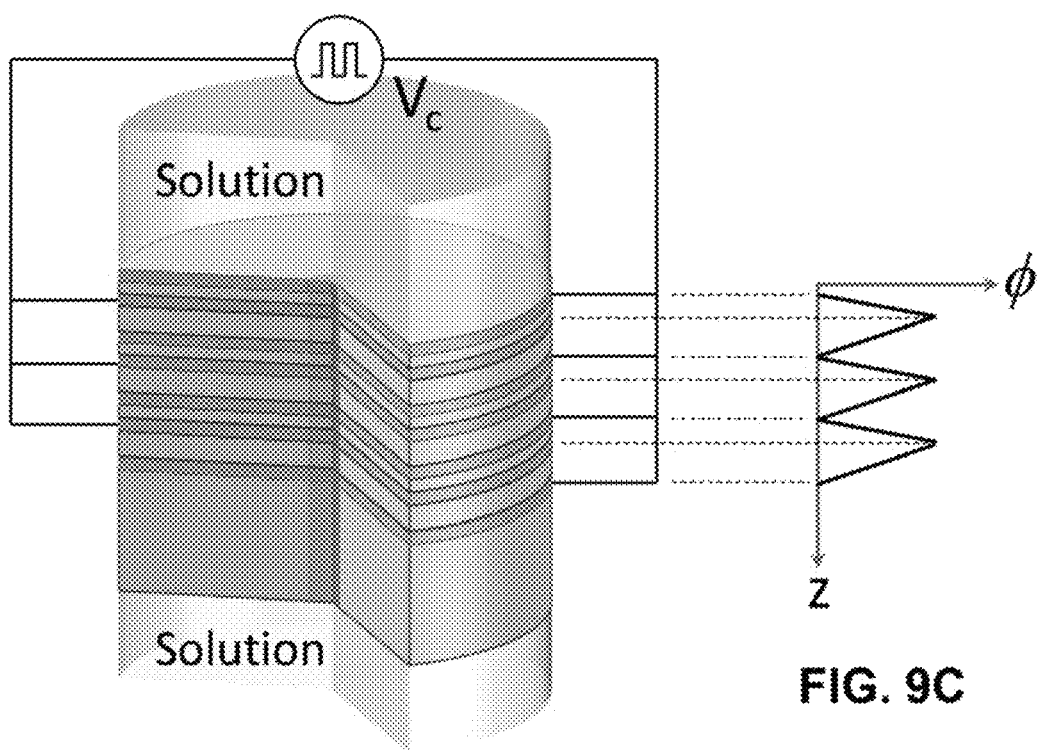
FIG. 9B
FIG. 9C

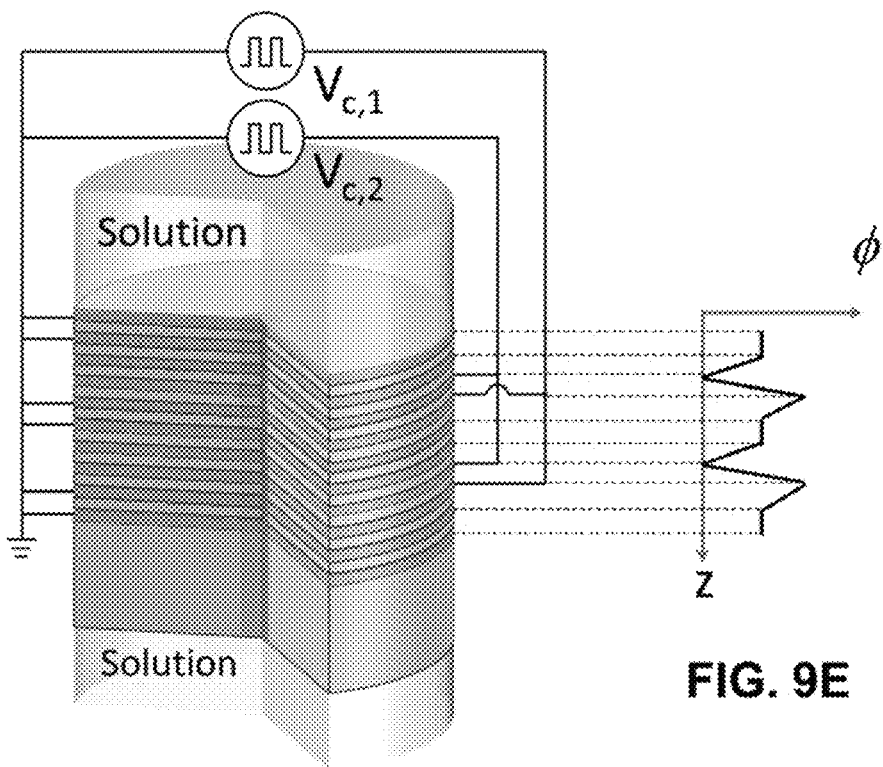
FIG. 9D
FIG. 9E
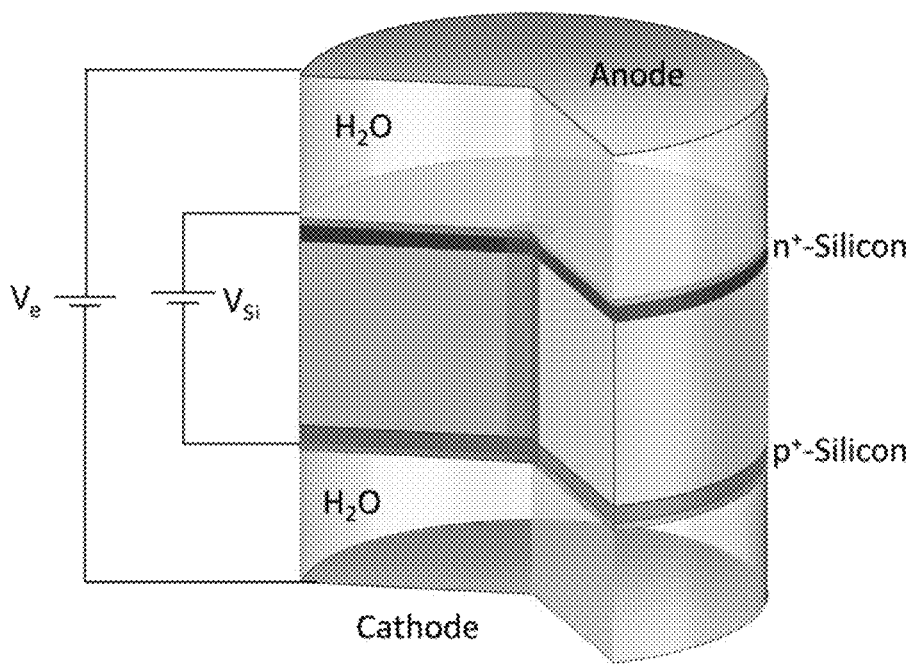
FIG. 10

RATCHET-BASED ION PUMPING MEMBRANE SYSTEMS

CROSS-REFERENCES TO RELATED APPLICATIONS

This application is a non-provisional and claims benefit of U.S. Patent Application No. 62/863,761, filed Jun. 19, 2019, the specification(s) of which is/are incorporated herein in their entirety by reference.

STATEMENT REGARDING FEDERALLY SPONSORED RESEARCH OR DEVELOPMENT

This invention was made with government support under Grant No. DE-AC02-05CH11231 and DE-SC0004993 awarded by the Department of Energy. The government has certain rights in the invention.

BACKGROUND OF THE INVENTION

Field of the Invention

The present invention relates to ion pumps, namely, to devices that implement ratchet-based mechanisms to pump ions.

Background Art

Ion pumps are devices that use power to introduce a net ionic flux. For example, in cell membranes, nanoscale channels transduce the free energy available from adenosine triphosphate (ATP) hydrolysis to pump different types of ions against a gradient in their electrochemical potential. In natural photosynthetic processes, light is used to pump protons against a gradient in their electrochemical potential so that the stored ionic energy can be used by ATP synthase to produce energy sources required in the Calvin Cycle to synthesize sugars. Although widely used in Nature, there are very few synthetic technologies that rely on ions for sensing and signaling, power generation, and energy storage and use. Related Prior Demonstrations of Ionic Devices Ion pumps are driven by a stimulus. While several stimuli are feasible, electricity and light are two common means. Electricity has been used in various ion pump designs to drive electrodialysis, capacitive deionization, ion intercalation deionization,[1,2] and related applications. In other device designs, spatially asymmetric electric potential distributions are beneficial because they provide ease by which sensing and directional ion transport can occur where, in particular, diodes that rectify ionic current serve as basic building blocks. Ionic diodes have been demonstrated by Bockris and co-workers using bipolar membranes that contain a built-in asymmetric electric potential distribution,[3] and Rolandi, Gorodetsky, and colleagues using biological and biomimetic structures that were shown to serve as ionic transistors.[4,5] Nanoporous materials have also been shown to exhibit ionic current rectification in the presence of modest salt concentrations due to the surface charge of the sub-10 nm pores imparted by the chemical functionalities that line the inner walls. These materials are different from the other diodes in that there is little to no net electric potential drop across the membrane in the absence of a polarization bias. However, application of an external bias to induce ionic current flow results in an enrichment or depletion of ions in regions of the sub-10 nm charged pores and ultimately ionic current rectification. The most successful demonstrations by Siwy, Jiang, and colleagues rely on conical nanopores etched in polymer films or $SiN_x$.[6-11] While demonstrating both ionic diode rectification and ionic transistor behavior, this group of ion pumps relies on external biases and chemical reactions to facilitate net ionic transport.

Photoelectrochemical-based ion pumps have also been demonstrated. Some notably examples include the work of Ardo and co-workers used photoacid-dye-sensitized ion exchange membranes to demonstrate light induced proton pumping,[12-15] Antonietti and co-workers fabricated a light actuated ion pump made of carbon nitride nanotube membranes,[16] Gau and co-workers introduced light driven proton pumping through doped Janus graphene oxide membranes,[17] and Bakker and co-workers[18] illuminated different sides of a spiropyran doped membrane with different wavelengths introducing different chemical transformations on each side of the membrane that shuttled protons across it. Related Prior Demonstrations of Electronic Flashing Ratchets A ratchet is an asymmetric device whereby through use of an alternating stimulus, net directional species transport results. Some well-known examples of ratchets include a car lack where pushing a lever up and down results in an upward motion of the car, ATP synthase powered by proton-motive-force-driven ion translocation through a membrane in order to drive formation of unfavorable ATP from ADP and $P_i$, and a rectifying electronic diode powered by an AC voltage to result in net DC current. Each of these ratchets is considered a tilting ratchet, or a rocking ratchet,[19,20] because the force that results in net species transport is applied external to the entire pump, thus "tilting" the electric potential distribution within it.

Electronic ratchets are devices that utilize modulations of spatially asymmetric electric potential distributions to drive a non-zero temporal mean current.[21-27] Electronic ratchets have been demonstrated both theoretically and experimentally[21,22,24-28] using induced charge electrokinetics to drive net transport of uncharged species,[29] alternating electronic polarization to drive net electronic current,[21-28,30,31] and alternating redox reactions to drive net ionic current.[6,7] In flashing ratchets the force that results in net species transport is applied internal to the pump.[22,32,33] To date, no theoretical or experimental reports exist that describe the present invention to use alternating electronic polarization to drive net ionic current using a flashing ratchet mechanism, by what is referred to herein as an electric-polarization-induced ionic ratchet (EPIIR).

FIG. 3A shows a schematic illustration of the operating principles of a flashing ratchet.[23] Open circles mark the position of the charged particles at the beginning of every step and blue circles mark the position of the charged particles at the end of every step. The sawtooth potential distribution through the device (solid blue line) is switched between two states such that in every step of the process potential maxima turn into potential minima, and vice versa.

In the initial step, $t_1$, the charged particles rest at the potential minimum at $x_1$. Upon potential switching, the charged particles flow toward the potential minima at $x_0'$ and $x_1'$. However, since the gradient in electric potential is steeper in one direction than the other, the particles flowing toward $x_1'$ will reach this potential minimum before the particles flowing toward $x_0'$. When the potential is switched again, half of the particles at $x_1'$ will continue flowing to the right toward the potential minimum at $x_2$. If the potential is switched before the particles flowing to the left reach $x_0'$, most of these particles will return back and settle again in $x_1$. Since all charged particles are either transported to $x_2$ or remain in $x_1$, there is a net particle flux to the right. Here the present invention utilizes ratcheting principles to demonstrate a first of its, kind ratchet-based ion pump.

Applications of Ionic Processes

Controlling ion transport in solutions is critical to many societal challenges, including generation of clean water for human consumption and agriculture, recycling electronics and spent nuclear fuel for recovery, concentration, and reuse of rare and expensive materials and chemicals, sensors, development of technologies that rely on machine-biological interfaces, among others. Electricity-based devices are timely due to the widespread increased electrification of society through installation of renewables to replace historical energy sources based on fossil fuels, as well as their simplicity and lack of moving parts that are of increased interest for use in next-generation distributed energy, water, and sensor technologies. Through the combination of electricity and custom-engineered membranes, one can specifically tune the selectivity and efficacy of a variety of ionic processes.

One non-limiting example application is for water desalination, which requires a process that generates a large enough free energy to drive the unfavorable separation of water and/or salt from saline water. The amount of free energy at room temperature to overcome a tenfold increase in monovalent ion activity, which is often approximated by concentration, is equal to an electric potential of 0.118 V=(59 mV×2 ions), and a modest potential of ~0.21 V is sufficient to maintain a 60-fold concentration gradient, which is approximately the salt concentration ratio between sea water and potable water. Commercial electrodialysis achieves ion pumping and desalination by driving redox reactions, which waste voltage as kinetic overpotentials for the redox reactions and require redox-active species in the saline water. Capacitive deionization achieves ion pumping and desalination through interfacial charging, but requires that desalination stops when the charge capacity of the electrodes is reached, thus requiring that the water flow streams be switched from saline to desalted in order to discharge the salt and enable further operation.

As another non-limiting example application, membranes can be used for ion separation whereby an external force acts on species to drive them through the membrane with chemical specificity based on total charge, size, and/or local charge density. This force can arise from an applied pressure, gravity, temperature gradients, or others, but of particular increased interest are electric fields because of their simplicity in being generated at electrified interfaces using electricity or light. Electricity-driven separations are by nature electrochemical and therefore are driven by charging interfaces between electrically and ionically conductive media. They can be implemented as either batch processes, where interfacial (pseudo)capacitive charging reactions are subsequently coupled to interfacial (pseudo)capacitive discharging reactions, or continuous processes, where sustained currents are enabled through direct coupling of interfacial charging reactions with heterogeneous redox reactions between electrodes and liquid electrolytes. Non-electrical separations processes have drawbacks in that typically they require large amounts of solvents to provide the medium for classical separations or the addition of chemical species, such as chelates or sorbents, to the water in order to change the properties of dissolved species and alter their solubility in a phase.

Continuous electrochemical processes are simple to engineer because they require no moving parts or mechanical switches, yet when driven by redox reactions, they require the presence of soluble chemical species to serve as reactants and products of each redox reaction. Requiring additional soluble chemical species complicates this otherwise simplistic design and often times is a nonstarter for separations technologies because the added chemical species may not be compatible with desired processes or ultimate uses, e.g. adding molecules to drinking water. While batch electrochemical processes require more complex maintenance of flow streams due to the limited capacity of (pseudo)capacitive charging/discharging reactions, the simplicity of these interfacial reactions and lack of additional soluble chemical species are desirable traits.

Besides water desalination and separations, a ratchet-based ion pump can be used in many other applications. Some non-limiting examples include fine control of ion flow out of a reservoir in a drug delivery system and to increase the sensitivity of chemical sensors. Moreover, there is significant recent interest in trying to mimic logic processes in neurons and the brain via neuromorphic computing, and develop machine biology interfaces. In order to better mimic Natures brain circuitry, several groups are working to design, demonstrate, and control ionic transistors.[8,10,34-39]

BRIEF SUMMARY OF THE INVENTION

It is an objective of the present invention to provide systems and devices that make use of a ratchet mechanism to pump ions in steady state without necessarily introducing electrochemical reactions, as specified in the independent claims. Embodiments of the invention are given in the dependent claims. Embodiments of the present invention can be freely combined with each other if they are not mutually exclusive.

In some aspects, the present invention features an ion pump based on an electronic ratchet mechanism. By removing the requirement to drive redox reactions, which is required in commercial electrodialysis, the present invention does not waste any voltage to undesired redox reactions, does not corrode due to redox, and does not generate redox products that could affect the water sources, By allowing for continuous operation, the system does not need to stop desalinating during operation, unlike in capacitive deionization which must switch the water flow streams from saline to desalted after the ionic capacitor or battery is fully charged or discharged.

Electronic ratchets are devices that utilize modulation produced by spatially varying electric fields to drive a non-zero temporal average current. Similar to peristaltic pumps, where the pump mechanism is not in, direct contact with the pumped fluid, electronic ratchets induce net current with no direct charge transfer between the power source and the pumped charge carriers. Thus, electronic ratchets can be used to pump ions in steady state with no electrochemical reactions between the power source and the pumped ions, resulting in an ion pump that is more energy efficient than any other electrochemical deionization/desalination design.

As will be described herein, electric-Polarization-induced ionic ratchet (EPIIR)-based ion pumps were numerically simulated. Computations show that the ratchet mechanism facilitates net ion pumping and that the magnitude of the ionic current is heavily dependent on the frequency and shape of the input signal. The optimal frequency for voltage generation is directly related to ion mobility and inversely related to the time constant for charging and discharging, but also depend on other parameters such as the shape of the electric potential distribution, the width of the electric potential distribution, among others.

EPIIR-based ion pumps were fabricated by coating the two outer surfaces of nanoporous alumina wafers with gold forming a nano-porous capacitor. Electric fields within the nanopores were altered by modulating the voltage applied across the capacitor. When immersed in solution, ions within the pores experienced time varying electric fields resulting in ratchet-based ion pumping. The device pumping performance was evaluated for various input signals, geometries and solutions. The proposed devices may be used as building blocks in a wide range of applications such as for water desalination, concentration of salts, chemical separations, sensors, artificial photosynthesis, and many others. This architecture provides a straightforward path for devices with a very large active area that would be difficult to realize with other recent ratchet demonstrations.

According to some embodiments, the present invention features an ion transport structure that comprises an ion-permeable layer coupled to at least two contacts. The ion transport structure is configured to transport ions across an ion-permeable layer when a spatially asymmetric electric potential distribution is temporally modulated to change electric fields within the ion transport structure, resulting in a ratchet-driven ion pump. In some embodiments, the spatially asymmetric electric potential distribution is temporally modulated by the application of a stimulus or perturbation to the structure to alter the electric fields. The stimulus or perturbation may be an electrical bias, light, a temperature gradient, or a pH gradient. The ion transport structure may be configured to continuously transport ions using alternating electronic polarization. Without wishing to limit the present invention, the ion transport structure can pump ions with minimized resistance and without using electrochemical reactions or mechanical forces.

In some embodiments, the ion-permeable layer comprises a dielectric material, a semiconductor, a polymer, or an ion-selective material. In some embodiments, the contact is a layer or wire comprised of an electrically conductive material. In some embodiments, a plurality of channels is disposed through the ion transport structure.

According to another embodiment, the present invention, features a method of moving ions. The ions are moved in a solution by providing an ion transport structure as described herein, placing the ion transport structure in the solution, and temporally modulating a spatially asymmetric electric potential distribution to change electric fields within the ion transport structure to transport ions across the ion-permeable layer.

In other embodiments, the present invention features an ion transport structure comprising a plurality of ion-permeable layers and a plurality of contacts that form a stack in which the ion-permeable layers alternate with the plurality of contacts. The ion transport structure is configured to transport ions through the stack when a spatially asymmetric electric potential distribution is temporally modulated to change electric fields within the ion transport structure; resulting in a ratchet-driven ion pump. The ion transport structure may include a plurality of channels disposed through the stack of alternating layers.

In some embodiments, the present invention comprises an ion pumping system that comprises an ion transport structure. The ion transport structure comprises an ion-permeable layer and at least two contacts coupled to the ion-permeable layer, and a first and a second ion-selective membrane that are operatively coupled to the ion transport structure. The first ion-selective membrane and the second ion-selective membrane are each selective for ions having a specific charge. The ion pumping system may also include a plurality of channels disposed through the ion transport structure.

Without wishing to be bound to a particular theory or mechanism, the ions in solution are transported across the ion pumping system when a spatially asymmetric electric potential distribution is temporally modulated to change electric fields within the ion transport structure, resulting in a ratchet-driven ion pump. In some embodiments, the spatially asymmetric electric potential distribution is temporally modulated by application of a stimulus or perturbation to the structure to alter the electric fields within the ion pumping system. The stimulus or perturbation may be an electrical bias, light, a temperature gradient, or a pH gradient. The ion transport structure is configured to continuously transport ions using alternating electronic polarization with minimized resistance and without using electrochemical reactions or mechanical forces.

In one embodiment, the first ion-selective membrane is disposed on the ion transport structure and the second ion-selective membrane is attached to the ion transport structure such that the second ion-selective membrane and ion transport structure are side by side. In another embodiment, the first ion-selective membrane and, second ion-selective membrane are disposed side by side on the ion transport structure.

In some other embodiments, the at least two contacts in the ion pumping system comprise two sets of interlaced contact fingers, and each set is connected to different channels. A first set of strips comprising the first ion-selective membrane are disposed on one set of contact fingers and a second set of strips comprising the second ion-selective membrane is disposed on the other set of contact fingers such that the strips of the first ion-selective membrane alternate with the strips of the second ion-selective membrane. Each set of contact fingers has a corresponding set of interlaced contact fingers disposed on the second surface of the ion-permeable substrate and are connected to the same channels, thereby forming a paired set. Each paired set is connected to its own separate power source.

In some embodiments, the present invention comprises a deionization system for moving ions in a solution from a first compartment to a second compartment. The deionization system may comprise an ion pumping system described herein. The ion pumping system separates the first and second compartment. Each compartment may contain the solution having an initial concentration of ions. When a spatially asymmetric electric potential distribution is temporally modulated to change electric fields within the ion transport structure, resulting in a ratchet mechanism, ions from the first compartment are selectively transported in one direction across the ion pumping system, thereby increasing the ion concentration in the second compartment and reducing the ion concentration in the first compartment.

In one embodiment, the desalination system may comprise the first ion selective membrane, which is disposed on the ion transport structure, and the second ion-selective membrane, which is attached to the ion transport structure, to form a single, continuous barrier that separates the first and second compartment. In another embodiment, the first ion selective membrane is disposed on the ion transport structure, and the second ion-selective membrane is disconnected from the ion transport structure. Each ion-selective membrane forms a barrier that separates the first and second compartment.

One of the unique and inventive technical features of the present invention is the continuous separation of ions using alternating electronic polarization to drive net ionic current.

Without wishing to limit the invention to any theory or mechanism, it is believed that this technical feature advantageously provides for the continuous separation of ions by using electricity and without requiring additional processes. None of the presently known prior references or work has the unique inventive technical feature of the present invention. Furthermore, the prior references teach away from the present invention. The current belief is that a redox reaction or change in flow streams is needed to have a continuous flow of ions. Existing processes that use electricity to drive ion transport and separation require the performance of an additional process to drive net ionic current, such as redox reactions, as are required in electrodialysis, and changing flow streams, as is required in capacitive deionization. Contrary to current teachings, surprisingly the inventors can drive net ionic current by only modulating electronic current into and out of the device. The present invention can pump ions with no redox reactions and without changing flow streams.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1A is a cross-sectional view of a non-limiting embodiment of an EPIIR-based ion pumping system comprised of an ion transport layer with at least one conductive layer on its surface. Ions are separated by applying an alternating voltage between the conductive layer and the solution on the other side of the ion transport layer. In some embodiments, a wire contact can be immersed in the solution.

FIG. 1B is another non-limiting embodiment of an EPIIR-based ion pumping system comprised of an ion transport layer with at least one conductive layer on each of its surfaces. Ions are separated by applying an alternating voltage between the conductive layers.

FIG. 1C shows a schematic illustration of an EPIIR-based ion pumping system comprised of stacked ion transport layers with conductive, layers between every two transport layers and on the two surfaces. Ions are separated by applying an alternating voltage between the conductive layers. In a non-limiting embodiment, connections to the layers can alternate between positive and negative, although it is not required. It is to be understood that in other embodiments, the connections can vary depending on the geometry.

FIG. 1D shows a schematic illustration of an EPIIR-based ion pumping system comprised of an ion transport layer with a conductive layer on each of its surfaces. An anion selective exchange layer is deposited on top of the EPIIR resulting in selective ion pumping. A cation exchange layer is placed near the EPIIR to allow the transport of cations resulting in a directed transport of both ion types from one side of the system to the other.

FIG. 1E shows a schematic illustration of an EPIIR-based ion pumping system comprised of an ion transport layer with at least one conductive layer on its surface. A cation selective exchange layer is deposited on top of the EPIIR ion pump resulting in selective ion pumping. An anion exchange layer is placed near the EMIR to allow the transport of anions resulting in a directed transport of both ion types from one side of the system to the other.

FIG. 1F shows a schematic illustration of an EPIIR-based ion pumping system comprised of two ion transport layers with separate conductive layers on each of their surfaces. A cation selective exchange layer is deposited on top of one EPIIR and an anion selective exchange layer is deposited on top of the second EPIIR thus each of the EPIIR predominantly pumps only one type of ion. Desalination is achieved when each of the EPIIRs is operated with a different voltage source.

FIGS. 2A-2B are schematics of the region at the vicinity of a pore in an EPIIR ion pump according to two embodiments of the present invention with the alternating electric potential, $V_c$, occurring at both contacts in FIG. 2A and at one contact in FIG. 2B. Ionic voltage, $V_e$, can be measured using stable reference electrodes, such as Ag/AgCl or saturated calomel electrode.

FIG. 3A shows the operating principles of a flashing ratchet.[23] The solid blue line illustrates the spatial electric potential distribution $(x_i)$ during three sequential time steps $(t_i)$. Modulation of the spatial electric potential distribution occurs from an initial state, $t_1$, to $t_2$ where then open circles mark the initial position of the charged particles at $t_2$ and filled circles mark the position of the charged particles after some time has passed. At $t_3$, the spatial electric potential distribution is returned to its initial distribution and charged particles initially at positions indicated by open circles transport to positions indicated by closed circles, illustrating net transport to the right corresponding to net current on going from $t_1$ to $t_3$.

FIG. 3B shows the operating principles of an ion permeable EPIIR at one contact. This scheme is similar to that shown in FIG. 3A, although the spatial electric potential distribution is shown in magenta. When the voltage is switched from $V^-$ to $V^+$, ions disperse in both directions albeit at different rates. If the voltage is switched back to $V^-$ before all ions have reached their steady state distribution, some of the left-flowing ions will be pulled into the potential well that is formed near the contact. Many right-flowing ions will not be pulled back into the potential well. The right-flowing ions transport faster due to the sharper gradient in potential and thus will be further away from the contact and generate net transport to the right corresponding to net current flow.

FIG. 6A shows a scanning electron micrograph plan view of an EPIIR fabricated from an anodized aluminum oxide (AAO) substrate with gold contacts.

FIG. 6B is a non-limiting schematic of a measurement setup to detect ionic voltage, $V_{out}$, based on an input ratchet signal, $V_c$. Ionic currents can be measured by replacing the voltmeter, V, with a low-impedance ammeter.

FIGS. 6C-6E show a non-limiting design of a test cell used to pump ions that uses an EPIIR to generate an ionic voltage that is then used to force directional transport of anions and result in net deionization when the solution level is raised as shown in FIG. 6E, left.

Figure 7B:
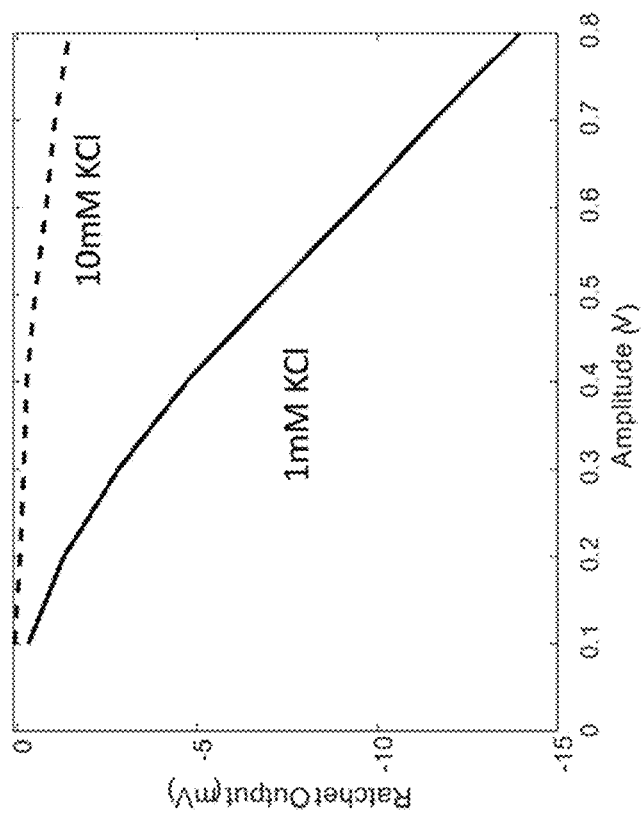
FIG. 7B shows the ionic open-circuit voltage measured between two Ag/AgCl wires across an EPIIR with nominally 40 nm diameter pores as a function of the input signal amplitude (peak to peak) for aqueous electrolyte solutions of 1 mM KCl and 10 mM KCl. The input signal is a square wave with a duty cycle of 50%, and a frequency of 100 Hz.
Figure 7A:
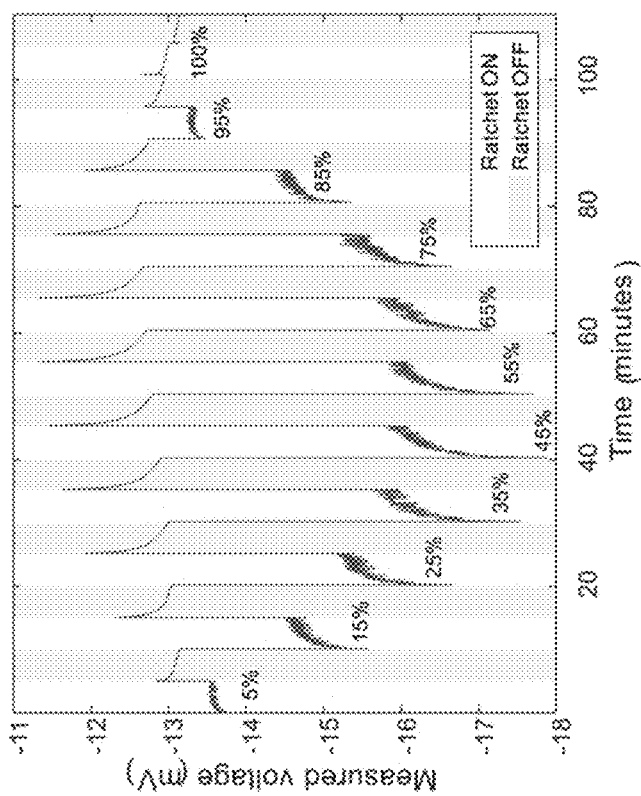
FIG. 7A shows the ionic open-circuit voltage measured between two Ag/AgCl wires across an EPIIR with nominally 40 nm diameter pores with input signals at various duty cycles. The aqueous electrolyte solution is 1 mM KCl and the input signal is a square wave switched between −0.2 V and 0.2 V at a frequency of 100 Hz.
Figures 7C, 7D:
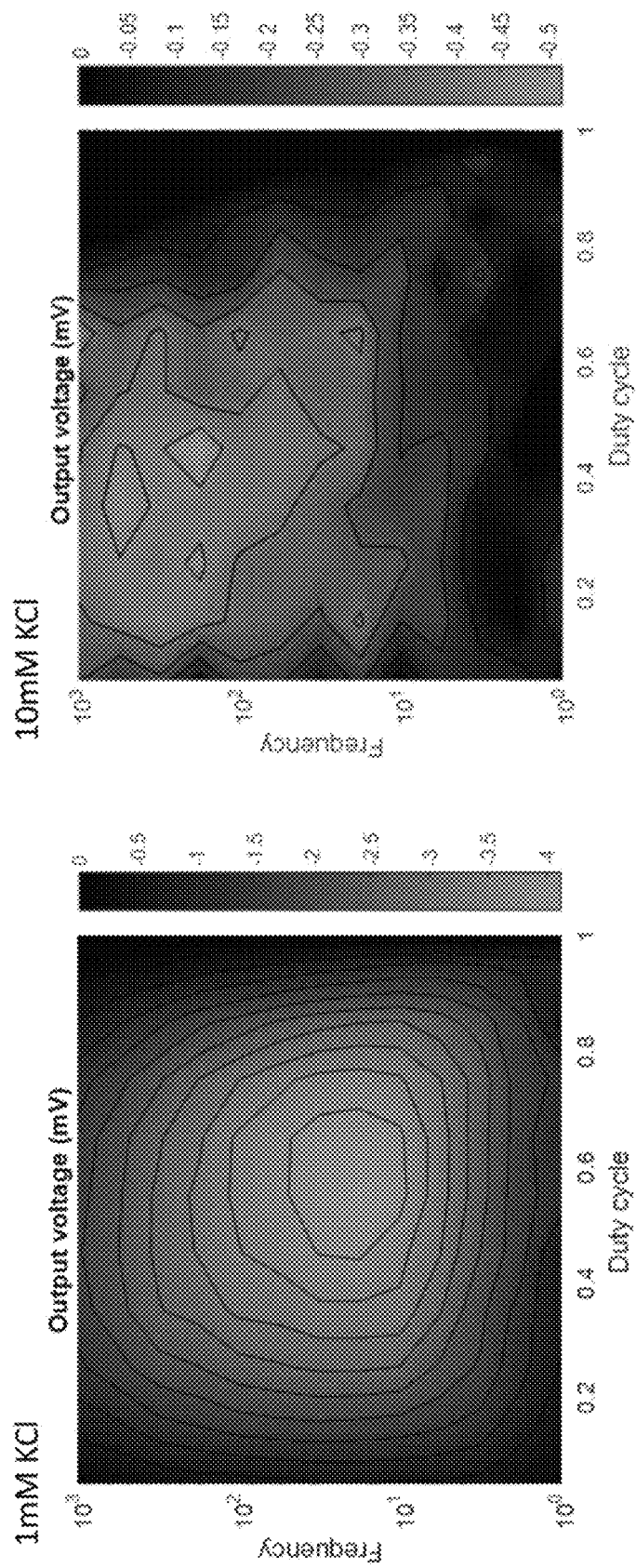

FIGS. 7C-7D show the ionic open-circuit voltage measured between two Ag/AgCl wires across an EPIIR with nominally 40 nm diameter pores as a function of the input signal frequency and duty cycle. The input signal is a square wave switched between −0.2 V and 0.2 V and the aqueous electrolyte solution is 1 mM KCl (FIG. 7C) and 10 mM KCl (FIG. 7D).

Figure 8A:
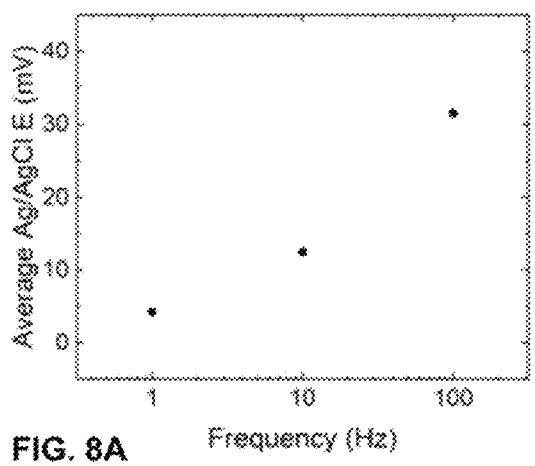

FIG. 8A shows the ionic open-circuit voltage measured between two Ag/AgCl wires across an EPIIR with nominally 40 nm diameter pores for frequencies of 1 Hz, 10 Hz, and 100 Hz. The aqueous electrolyte solution is 10 mM HCl and the input signal is a square wave switched between 0 V and 0.8 V with a duty cycle of 0.5.

Figure 8B:
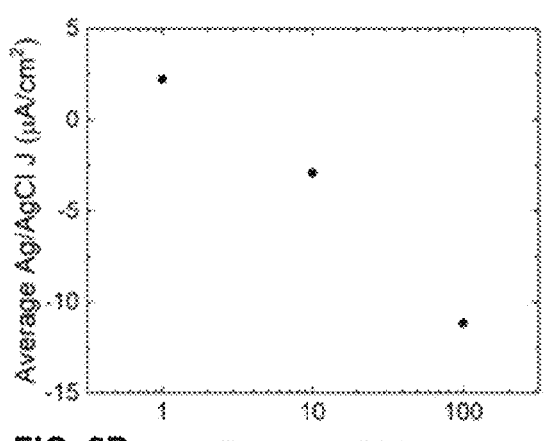

FIG. 8B shows the measured ionic short-circuit current density between two Ag/AgCl wires across the EPIIR with the same conditions as in FIG. 8A.

Figure 8C:
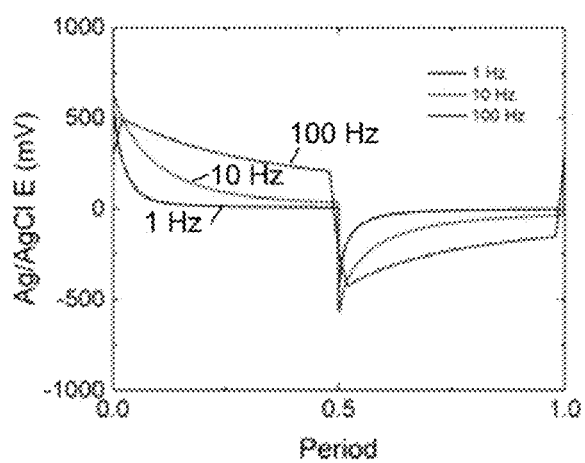
Figure 8D:
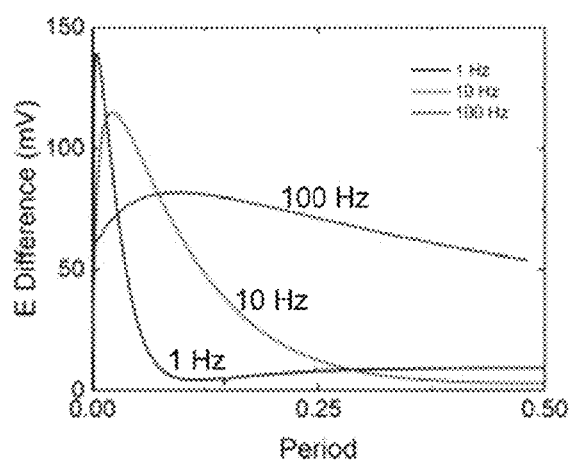

FIGS. 8C-8D show the ionic open-circuit voltage measured between two Ag/AgCl wires for a single period (FIG. 8C) and the sum of each half-period (FIG. 8D) across the EPIIR as a function of time with the same conditions as in FIG. 8A.

Figure 8E:
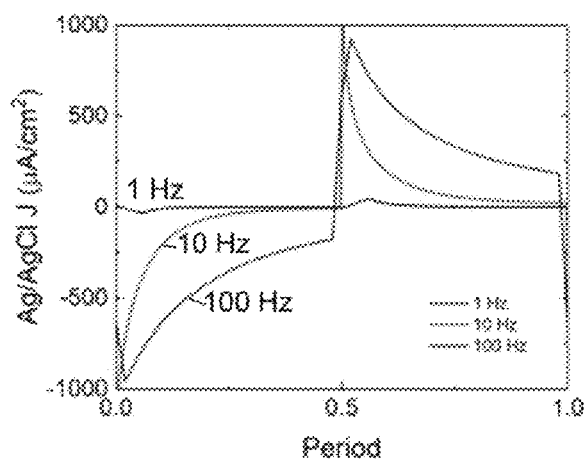
Figure 8F:
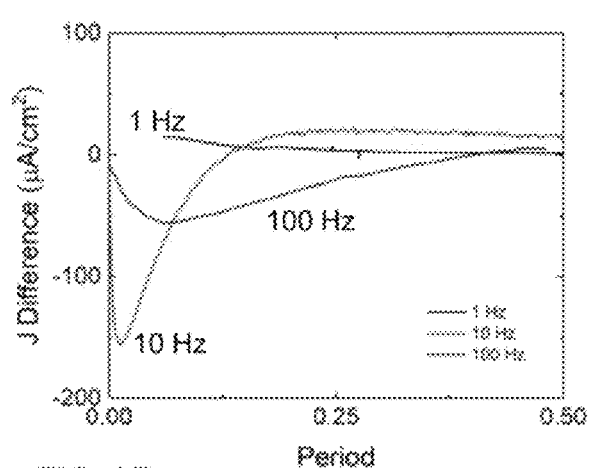

FIGS. 8E-8F show the measured ionic short-circuit current density between two Ag/AgCl wires for a single period (FIG. 8E) and the sum of each half-period (FIG. 8F) across the EPIIR as a function of time with the same conditions as in FIG. 8A.

FIGS. 9A-9E show schematic illustrations of a pore in an EPIIR ion pump for a single device (FIG. 9A), stacked EPIIR (FIG. 9B) and the spatial electric potential distribution within the pore (FIG. 9C), and stacked EPIIR operated as a reversible ratchet (FIG. 9D) and the spatial electric potential distribution within the pore (FIG. 9E).

FIG. 10 is a non-limiting schematic of the region at the vicinity of a pore in an EPIIR ion pump made of silicon with a p-i-n doping configuration for light-induced modulation of the electric potential, $V_{Si}$, across the pore.

Figure 11A:
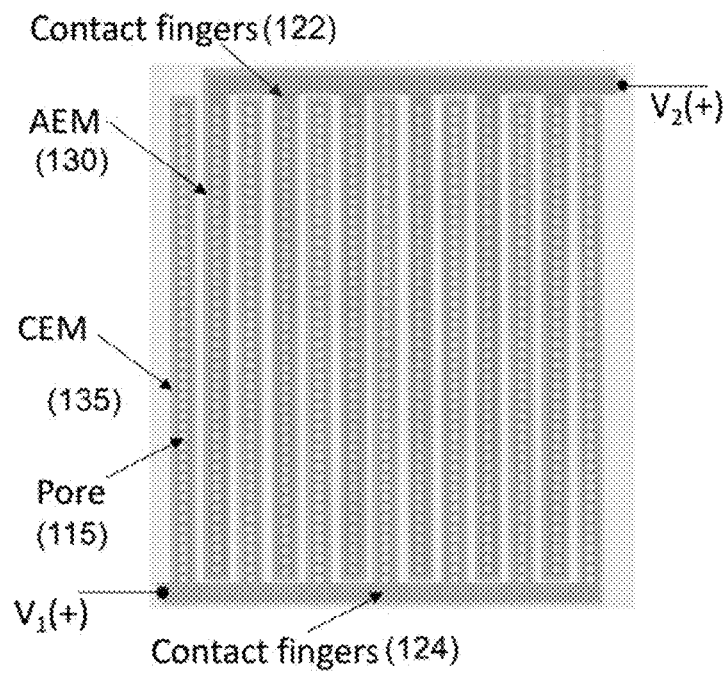
Figure 11B:
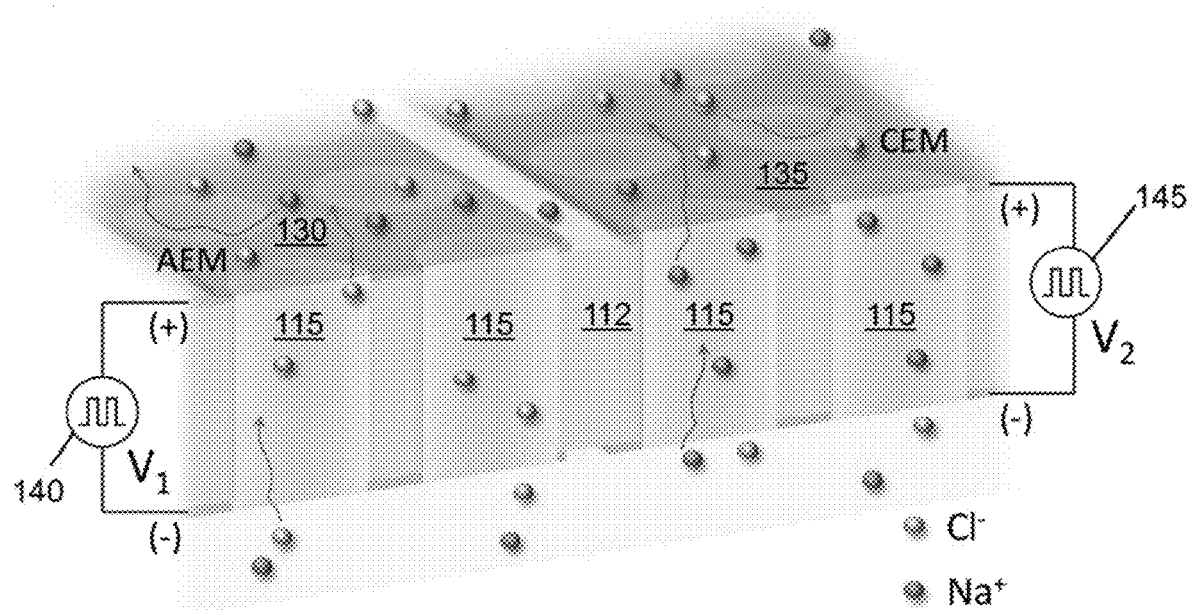

FIGS. 11A-11B show a top view (FIG. 11A) and a 3D representation (FIG. 11B) of non-limiting embodiments of an interdigitated EPIIR ion pump for minimized resistance, two compartment desalination.

DETAILED DESCRIPTION OF THE INVENTION

Following is a list of elements corresponding to a particular element referred to herein:
100 ion pumping system
110 ion transport structure
112 ion-permeable layer
114 first surface of the ion-permeable layer
115 channels
116 second surface of the ion-permeable layer
122 first contact
124 second contact
130 first ion-selective membrane
135 second ion-selective membrane
140, 145 power source As used herein, the term "contact" refers to an electrically conductive material. In some, embodiments, the electrically conductive contact may be in the form of a contact layer or a wire in solution. There may be a plurality of contacts coupled to the ion transport structure, but there should be at least one positive contact and one negative contact.

As used herein, the term "asymmetric electric potential distribution" refers to a spatial variation in electric potential in which these potential variations in the two halves of the structure between the contacts are not mirror images of each other.

Figure 1A:
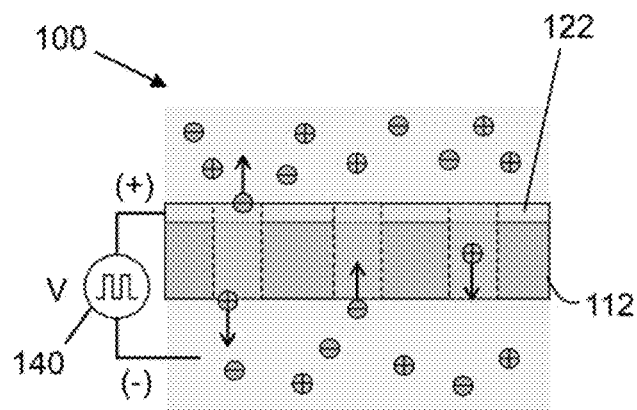
Figure 1B:
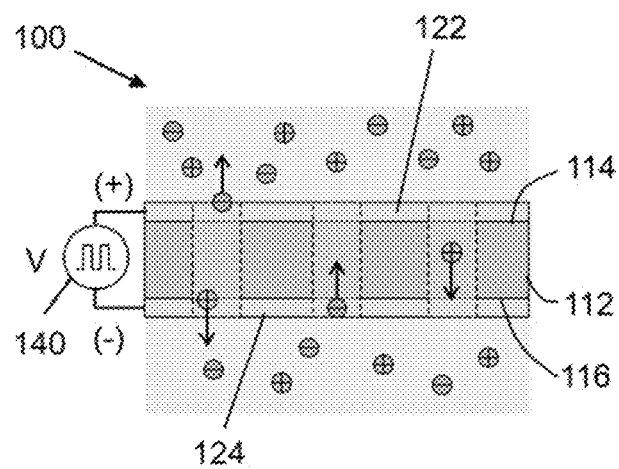

Referring now to FIG. 1A, in some embodiments, the present invention features an ion transport structure (110) comprising an ion-permeable layer (112) coupled to at least two contacts (122). Without wishing to limit the present invention to a particular theory or mechanism, the ion transport structure (110) is configured to transport ions across the ion-permeable layer (112) when a spatially asymmetric electric potential distribution is temporally modulated to change electric fields within the ion transport structure, resulting in ratchet-driven ion pumping.

As a non-limiting example, the ion transport structure (110) can transport ions across the ion-permeable layer (112) when a stimulus or perturbation, such as an electrical bias, light, a temperature gradient, or a pH gradient, is applied to the structure. Moreover, the ion transport structure (110) can pump salt with minimized resistance and without electrochemical reactions or mechanical forces, such as pressure or stress.

Figure 1C:
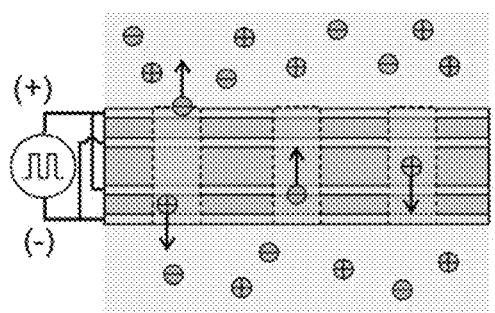

Referring to FIG. 1C, in other embodiments, the present invention features an ion transport structure (110) comprising a plurality of ion-permeable layers (112) and a plurality of contact layers (122) forming a stack in which the ion-permeable layers (112) alternate with the plurality of contacts (122). The ion transport structure (110) is configured to transport ions through the stack when a spatially asymmetric electric potential distribution is temporally modulated to change electric fields within the ion transport structure, resulting in ratchet-driven ion pumping, preferably with minimized resistance and without electrochemical reactions or mechanical forces, such as pressure or stress.

In some embodiments, the ion-permeable layer may comprise a dielectric material, a semiconductor, a polymer, or an ion-selective material. One non-limiting example of the dielectric material is alumina. A non-limiting example of the semiconductor is a silicon p-i-n junction. For the stacked ion transport structure (110), the plurality of ion-permeable layers may comprise a dielectric material, a semiconductor, a polymer, an ion-selective material, or combinations thereof such that the layers are not necessarily the same material. In some embodiments, the ion-permeable layers (112) can have the same thickness or vary in thickness.

In some embodiments, the electrically conductive contacts may comprise an electrically conductive material. The electrically conductive material may include, but is not limited to, a metal, conductive polymer, highly doped semiconductor, among others.

In some embodiments, at least one contact is connected to the ion transport structure (110). In other embodiments, two or more contacts are connected to the ion transport structure (110).

In one embodiment, a plurality of channels (may be disposed through the ion transport structure (110). For example, the channels (115) can be disposed through the stack of alternating layers. In conjunction with the various embodiments, the channels (115) can span from one surface to an opposing surface. In one embodiment, the channels (115) may be straight channels or pores. However, the channels do not necessarily have to be straight. In another embodiment, the channels may instead be a network of channels interconnected together to form a "sponge like" geometry.

In some embodiments, the channels (115) can have a diameter ranging from about 5 nm to about 500 nm. In other embodiments, the ion-permeable layer (112) can have a porosity ranging from about 10% to about 50%, e.g. fraction of the void (i.e. "empty") space or volume relative to the total volume of a material.

Figure 1D:
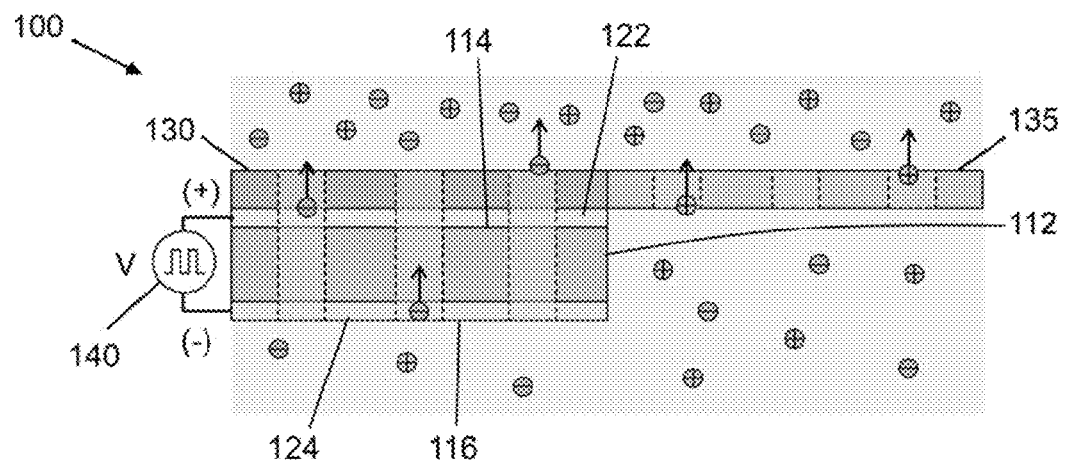
Figure 1E:
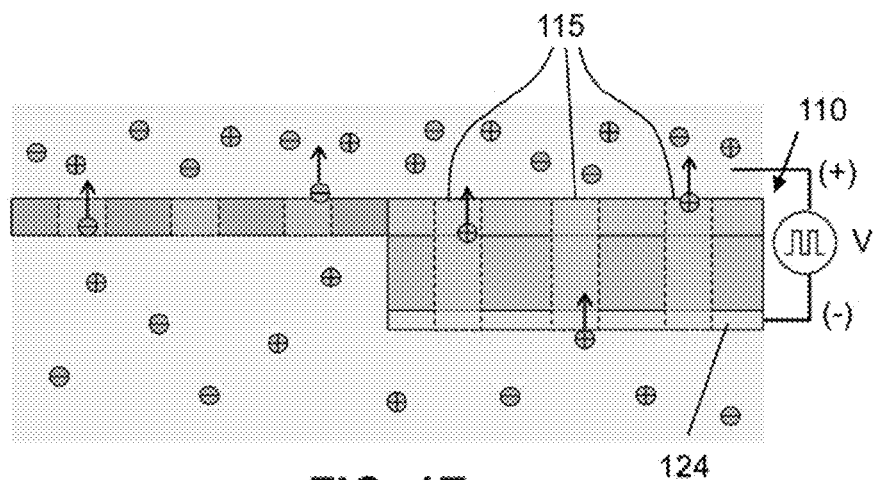
Figure 1F:
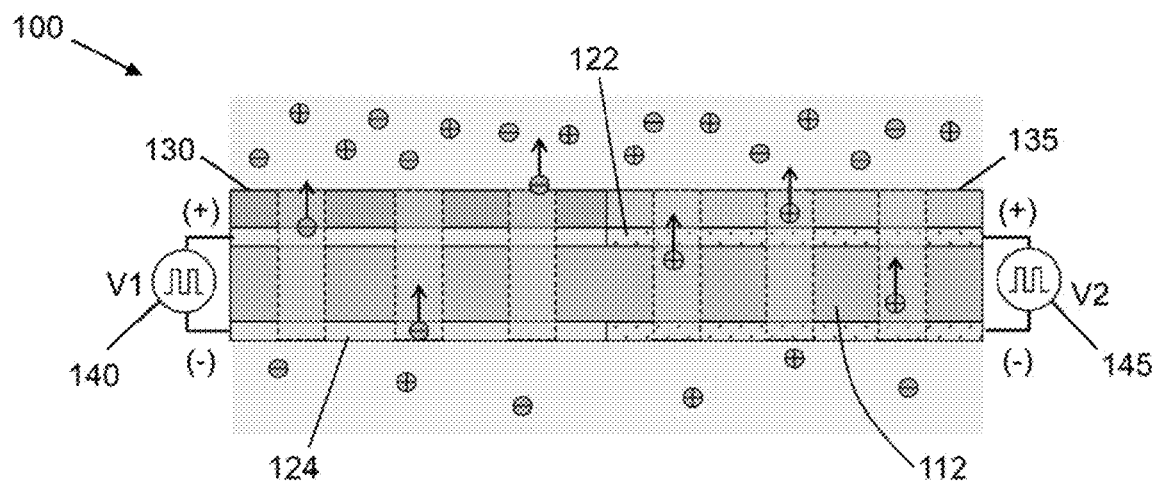

Referring to FIGS. 1D-1F, in some embodiments, the present invention features an ion pumping system (100) comprising the ion transport structure (110) having a first ion-selective membrane (130) disposed thereon and a second ion-selective membrane (135). In further embodiments, a power source (140) may be operatively coupled to the first contact layer (122) and second contact layer (124). In a non-limiting embodiment, as shown in FIG. 1D, the power source (140) can be connected to contact layers on both sides of the ion-permeable layer. In an alternative non-limiting embodiment, as shown in FIG. 1E, the power source (140) can be connected to the contact layer on one side only, e.g. one lead is connected to the one of the contact layers and the other lead is disposed in solution.

In one embodiment, the ion transport structure (110) may be according to the embodiment in FIG. 1D, which includes an ion-permeable layer (112) having a first surface (114) and an opposing second surface (116), a first contact layer (122) disposed on the first surface (114), a second contact layer (124) disposed on the second surface (116), and the first ion-selective membrane (130) disposed on the first contact layer (122). Alternatively, the first ion-selective membrane (130) is disposed on the outer contact layer of the stack of FIG. 1C.

In some embodiments, the power source (140) its configured to apply an alternating electrical bias between the first contact layer (122) and the second contact layer (124), which causes ions to be transported across the ion transport structure (110), which results in ratchet-driven ion pumping, whose voltage can be used to drive ions of opposite charge through the second ion-selective membrane (135). Without wishing to limit the present invention, the ion pumping occurs with minimized resistance and without electrochemical reactions. In other embodiments, the system (100) may further comprise a second power source (145) operatively coupled to contact layers that are not coupled to the first power source (140). The second power source (145) can apply an alternating electrical bias to said contacts.

In some embodiments, the first ion-selective membrane (130) and the second ion-selective membrane (135) are each selective for ions having a specific charge. For example, the first ion-selective membrane (130) is a cation-exchange membrane and the second ion-selective membrane (135) is an anion-exchange membrane. Alternatively, the first ion-selective membrane (130) is an anion-exchange membrane and the second ion-selective membrane (135) is a cation-exchange membrane. In other embodiments, ion-selective membranes (130) are made by asymmetric surface modification of the ion-permeable layer (112) using coupling chemistries to bond chemical moieties found in ion-exchange membranes directly to the ion-permeable layer (112). For example, the chemical moieties may include, but are not limited to, functionalized carboxylates, phosphonates, borates, amities, imidazoliums, or aromatic groups including alcohols.

In one embodiment, a plurality of channels (115) is disposed through the ion transport structure (110). The plurality of channels (115) may be straight channels or an interconnected network of channels. In some embodiments, the channels (115) can have a diameter ranging from about 5 nm to about 500 nm. In other embodiments, the ion-permeable layer (112) can have a porosity ranging from about 10% to about 50%, In one embodiment, as shown in FIGS. 1C-1D, the second ion-selective membrane (135) may be attached to the ion transport structure (110) such that the second ion-selective membrane (135) and ion transport structure (110) are side by side. In another embodiment, the second ion-selective membrane (135) may be separate from the ion transport structure (110).

In yet another embodiment, as shown in FIG. 11A, the first contact layer may comprise two sets of interlaced contact fingers (122 and 124), each set connected to different channels with no direct electrical contact between the two sets. A first set of strips comprising the first ion-selective membrane (130) may be disposed on one set of contact fingers and a second set of strips, comprising the second ion-selective membrane (135) may be dispose on the other set of contact fingers such that the strips of the first ion-selective membrane (130) alternate with the strips of the second ion-selective membrane (135). In further embodiments, each set of contact fingers has a corresponding set of interlaced contact fingers disposed on the second surface (116) of the porous substrate and connected to the same channels, thereby forming a paired set. Preferably, each paired set is connected to its own separate power source.

In some embodiments, as shown in FIG. 1F, the first power source (140) is connected to a paired set of contact fingers, and the second power source is connected to a second paired set of contact fingers indicated by the dotted pattern. In some embodiments, each power source applies a specific alternating electronic polarization. In other embodiments, the two power sources electronically interact to apply a series of two or more alternating electronic polarizations between any combinations of the four interlaced contact fingers.

Various factors can affect the choice of voltage, for example, if the pores are different sizes or depending on the thickness of the ion-permeable layer. In one embodiment, the same voltage source may be used for two sets of contacts with the contacts given opposite polarities. In another embodiment, V1 can equal V2 if the duty cycle is different or depending on the materials properties.

According to some embodiments, the ion-permeable layer may comprise a dielectric material, a semiconductor or a polymer. One example of the dielectric material is alumina A non-limiting example of the semiconductor is a silicon p-i-n junction. For the stacked ion transport structure (110), the plurality of ion-permeable layers may comprise a dielectric material, a semiconductor, a polymer, or combinations thereof such that the ion-permeable layers are not necessarily the same material.

In other embodiments, the electrically conductive contacts may comprise an electrically conductive material. The electrically conductive material may include, but is not limited to, a metal, conductive polymer, highly doped semiconductor, among others. For example, the metallic material may include, but is not limited to, gold, silver, copper, or metal alloys. As another example, the conductive polymer material may include, but is not limited to, poly(3,4-ethylenedioxythiophene), polyacetylene, or a composite material such as a graphene-polymer mixture. As another example, the highly doped semiconductor material may include, but is not limited to, Si, III-Vs, II-IVs, perovskites, or organic semiconductors such as poly(3-hexylthiophene). In one embodiment, the contacts may both be the same electrically conductive material or may be different electrically conductive materials. Because redox reactions are not intended to be performed at the electrically conductive contacts, after their deposition the electrically conductive contacts, and even the ion-permeable layer, can be coated in a chemically robust and electrically insulating coating to extend the lifetime of the device. As an example, the coating may include, but is not limited to, metal oxides such as alumina, silica, titania, and hafnia, and can be deposited by physical vapor deposition, by atomic layer deposition, electrochemically, among other methods.

According to other embodiments, the present invention may feature a deionization system for moving two types of oppositely charged ions in a solution from a first compartment to a second compartment. The deionization system may comprise any embodiment of the ion pumping system (100) described herein. The ion pumping system is configured to separate the first compartment from the second compartment. In one embodiment, the second ion-selective membrane (135) is attached to the ion transport structure (110) to form a single, continuous barrier that separates the first and second compartment. In another embodiment, the second ion-selective membrane (135) and the ion transport structure (110) are disconnected from each other, and each one forms a barrier that separates the first and second compartment. In yet another embodiment, the ion pumping system (100) comprised of the interlaced contact fingers forms a single barrier that separates the first and second compartment.

When used in a deionization procedure, each compartment contains the solution having an initial concentration of ions. When the power source (140) applies an alternating electrical bias to the contacts resulting in a ratchet mechanism, ions from the first compartment are selectively transported in one direction across the ion-selective membranes and into the second compartment, thereby increasing the ion concentration in the second compartment and reducing the ion concentration in the first compartment. In some embodiments, the desalination system may be used to desalinate or deionize solutions such as salt water, or in chemical separations.

EXAMPLE

The following is a non-limiting example of the present invention. It is to be understood that said example is not intended to limit the present invention in any way. Equivalents or substitutes are within the scope of the present invention.

EPIIR Simulations

Figure 2A:
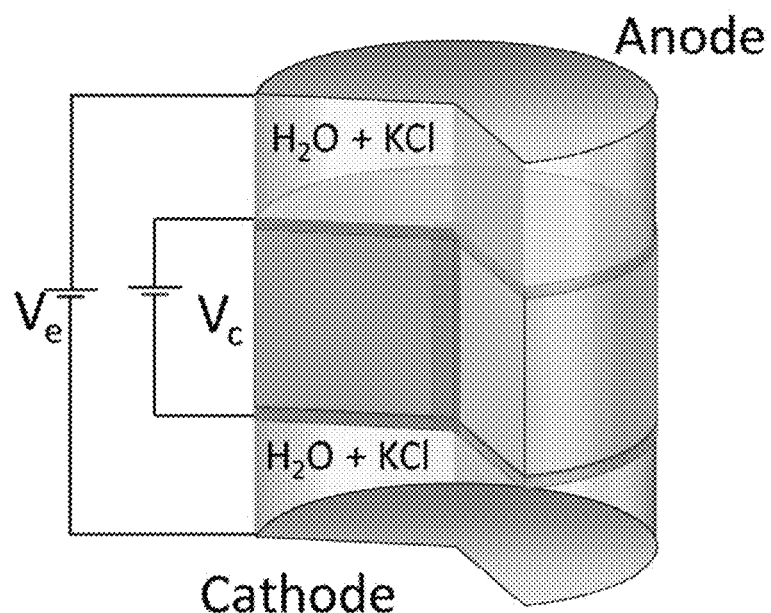
Figure 2B:
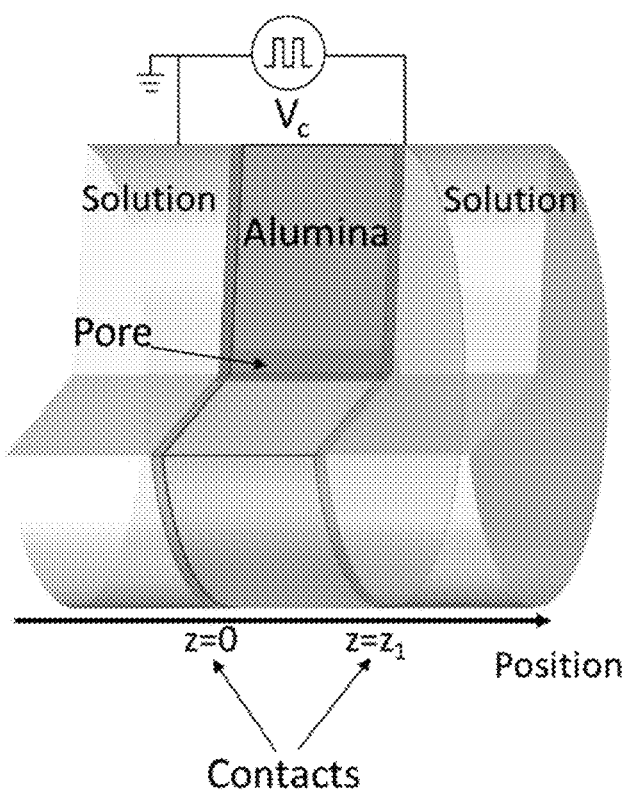
Figure 4A:
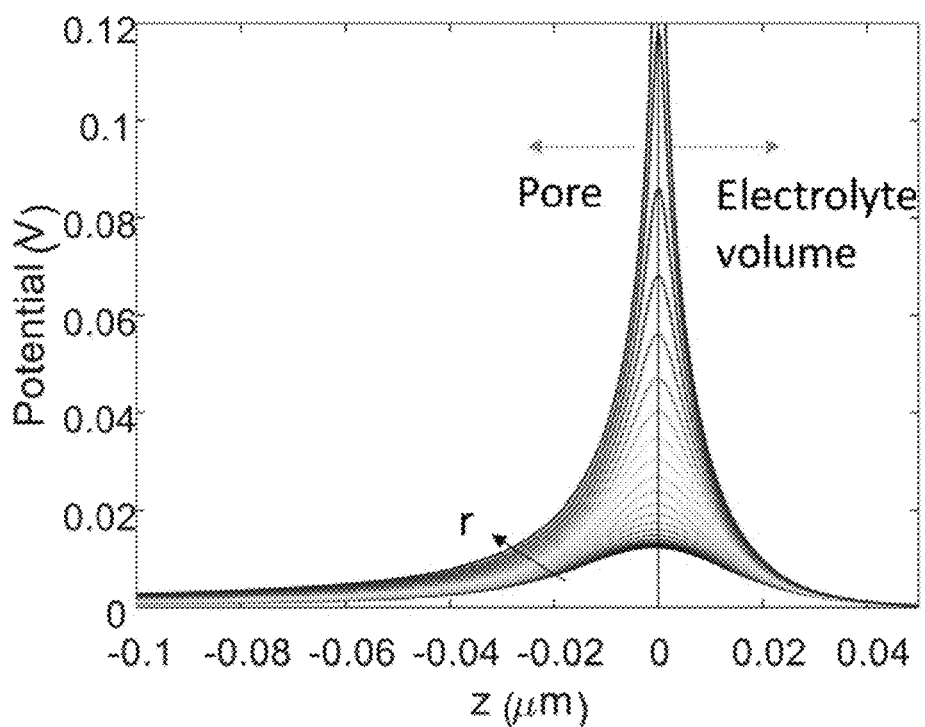
FIG. 4A shows the theoretical calculated spatial electric potential distribution near the EPIIR high voltage contact at various distances from the pore center, r, for an applied voltage of 0.4 V for the simulation domain shown in FIG. 2A.

The EPIIR theoretical pumping performance was estimated in two stages. First, the potential distribution within the device was calculated using finite elements simulations (COMSOL Multiphysics). Next, the potential distribution obtained in the finite elements simulation was used as an input in an analytic computation to obtain the net ratchet current.[23,31] The finite element simulation domain consisted of a single pore in an AAO wafer and the electrolyte around it. FIG. 2A shows a schematic illustration of the simulation domain. The solid region is assumed to be made of perfectly insulating alumina and the pore and electrolyte compartments on both sides of the EPIIR are filled with 1 mM KCl aqueous solution where only the salt ions are considered. The pore diameter is 40 nm, the wafer thickness is 50 μm and the thickness of the electrolyte compartments on both sides of the EPIIR is 1.5 μm which is significantly larger than the Debye length for this salt concentration. The point of zero charge is assumed to be at a potential of 0 V for all interfaces. At the edges of the simulation domain, the concentrations of salt ions are assumed to be 1 mM and the potential is set to 0 V thus simulating infinitely large compartments on both sides of the EPIIR. FIG. 4A shows the calculated potential distribution near the EPIIR high voltage contact at several distances from the pore center, r. The applied voltage is 0.4 V. As discussed above, the differences between the Debye length inside the pore and bulk electrolyte results in an asymmetric electric potential distribution, which is essential for the ratchet operation.

Figure 4B:
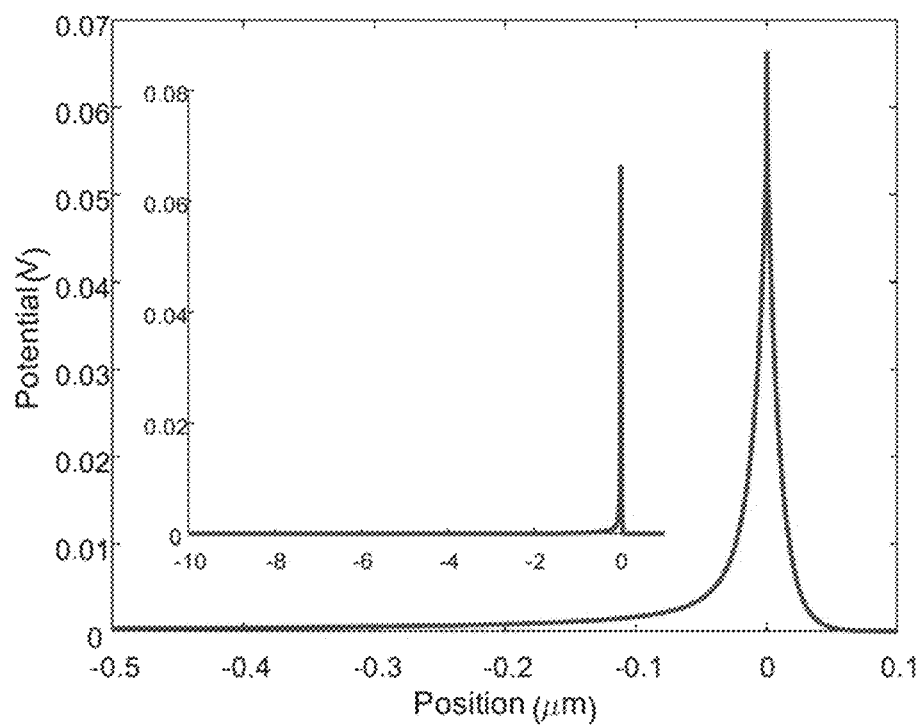
FIG. 4B shows the weighted average spatial electric potential distribution near the high voltage contact calculated using the potential distributions shown in FIG. 4A. The inset shows the potential further away from the contact.

In order to insert the two dimensional potential distribution calculated in the finite elements simulation into the analytic, net particle velocity calculation, the potential weighted average was calculated. FIG. 4B shows the weighted average near the high voltage contact. The inset shows a broader view of the potential distribution, and where the potential is at 0 V outside the region presented. The net particle velocity, v, is then computed with the weighted average potential distribution multiplied by the ratchet signal which is a square wave temporal function g(t) alternating between 0 and 1 at frequency f and duty cycle.[31] Since the potential is very close to zero outside a small region next to the high voltage contact, only a the region $-0.5$ μm$\leq z \leq 0.1$ μm was used for the net ion velocity calculation. Once the particle velocity is obtained, the net ionic current density, J, follows: $J=q_e n v \rho$, where $q_e$ is the electron charge, n is the concentration of ions which is taken to be 1 mM, and $\rho=0.1$ is the EPIIR porosity.

Figure 4C:
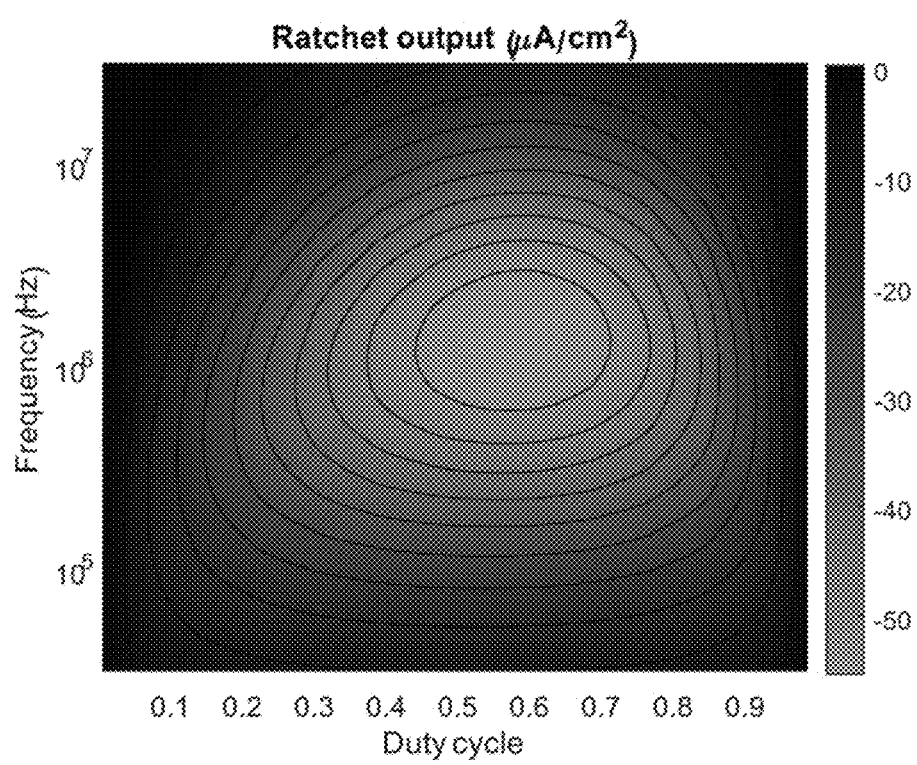
FIG. 4C shows the calculated EPIIR net ionic current, assuming short-circuit conditions for the transported ions, as a function of the input signal frequency and duty cycle. The potential distribution is as shown in FIG. 4B.

FIG. 4C shows the calculated ionic short-circuit current density for a wide range of input signal frequencies and duty cycles. As discussed above, the voltage switching must be at a period that prevents back flowing ions from leaving the region near the EPIIR high voltage contact. Thus, if the signal period is too long, back flowing ions will not be turned upon voltage switching and the net current will be zero. In a similar manner, at duty cycles near zero or one, the system operates closer to direct current operation and the net current is again near zero. The ionic current increases with frequency until the input signal switching time is significantly shorter than the period required for forward flowing ions to leave the region next to the EPIIR contact.

The EPIIR response at low frequencies is determined by the time required for back flowing ions to reach the next potential minimum (or maximum). On the other hand, the high frequency response is determined by the time required for forward flowing ions to reach a potential minimum (or maximum) point. Both of these time constants are determined by the diffusivity of the ions. Thus, ions with a different diffusivity have a different frequency response and there are specific frequencies in which ions of specific diffusivities will be pumped more efficiently than others.

Figure 5A:
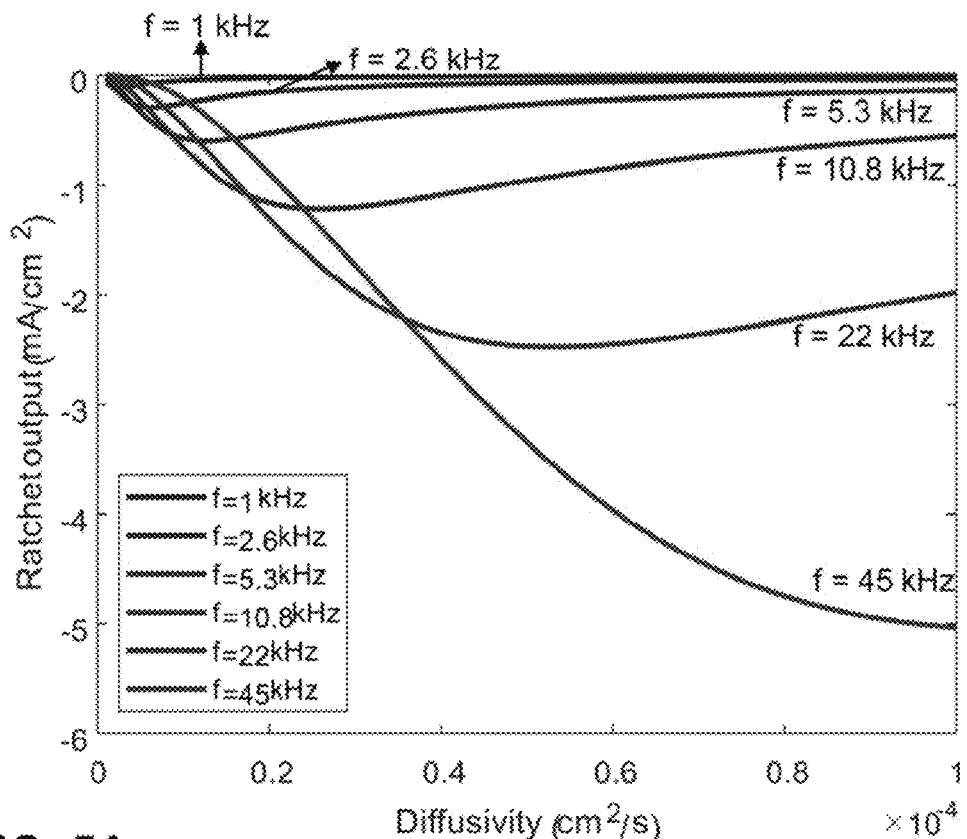
FIG. 5A shows the calculated EPIIR net ionic current, assuming short-circuit conditions for the transported ions, as a function of the ion diffusivity for several input signal frequencies.
Figure 5B:
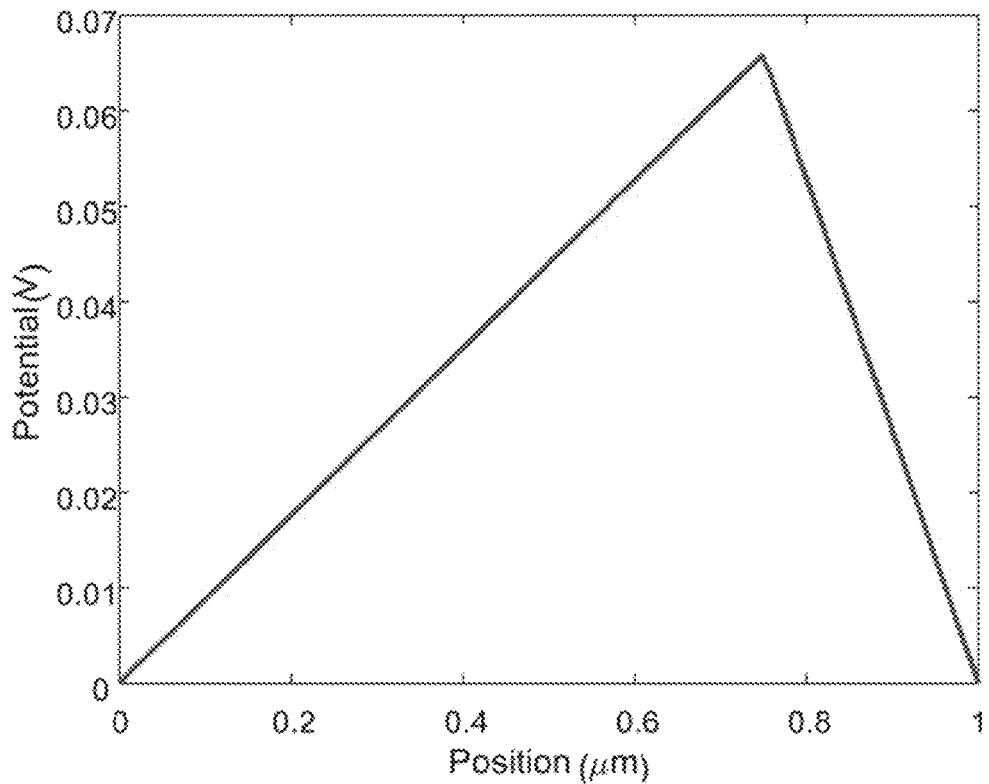
FIG. 5B shows the potential distribution used to calculate the data presented in FIG. 5A.

FIG. 5A shows the short-circuit current density as a function of the diffusivity of the ions at several input signal frequencies. The potential distribution is a saw-tooth distribution as shown in FIG. 5B and the input signal is $g(t)=0.5(1+\sin 2\pi ft)$. As can be seen in FIG. 5A, at every frequency there is a specific diffusivity at which the ratchet current is maximal (in absolute values). Thus, by tuning the input signal frequency, it is possible to choose which ions are pumped most efficiently based on their diffusivity. This selectivity enables pumping of specific ions out of mixtures of ions. In some embodiments, the optimal frequencies can range from about 1 GHz-1 MHz, 1 MHz-1 kHz, 1 kHZ-1 Hz, or 1 Hz-1 mHz. In other embodiments, a maximum frequency may be about 10 MHz. In some other embodiments, the minimum frequency may be about 1-10 mHz.

EXPERIMENTAL VALIDATION

Figure 6D:
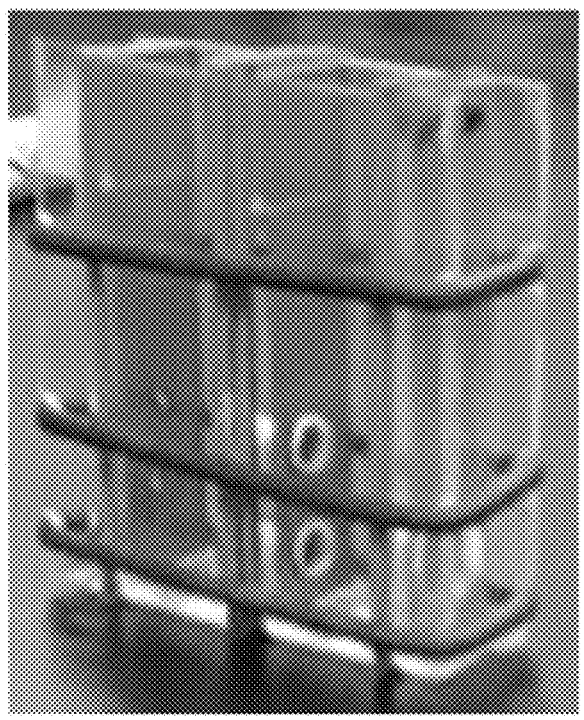
Figure 6E:
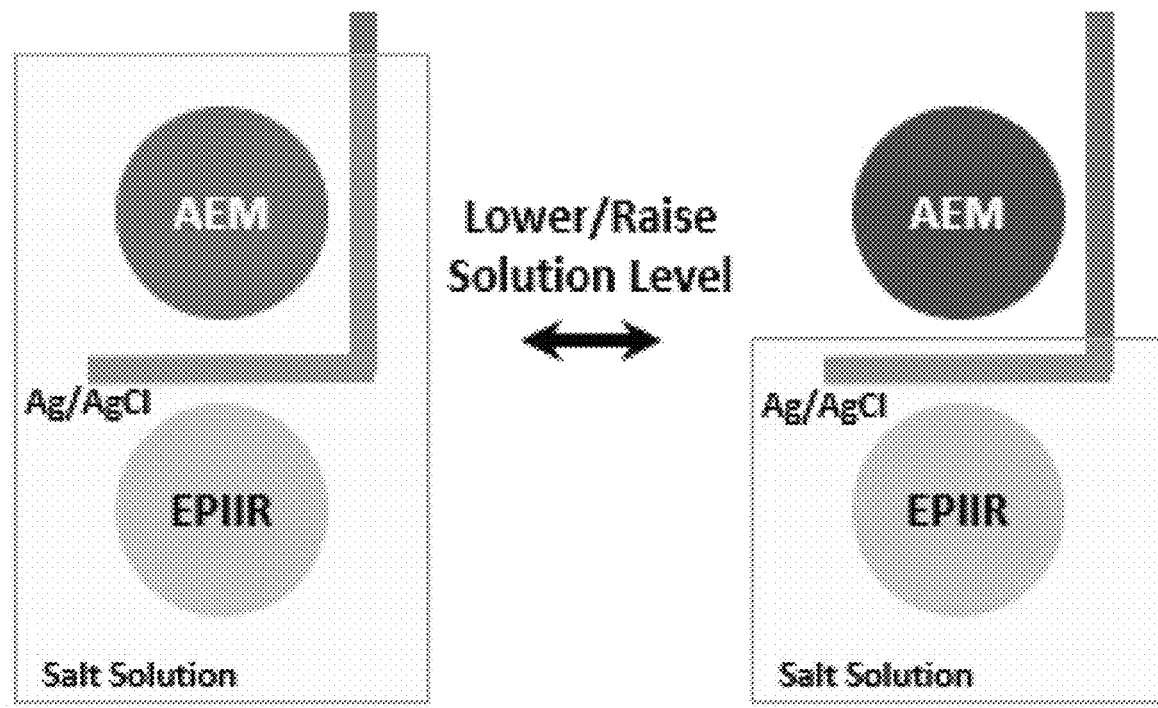

EPIIRs were fabricated by electron beam or thermally evaporating 10 nm of titanium as an adhesion layer and then 40 nm of gold (planar equivalent) on each surface of anodized aluminum oxide wafers (InRedox Materials Innovation) with various pore diameters. FIG. 6A shows a plan view SEM image of one of the EPIIRs fabricated. The ion pumping properties of the EPIIRs were tested in an electrochemical cell in which the EPIIR served as a membrane separating two electrolyte compartments, each containing an Ag/AgCl wire that was used to probe the potential between the two compartments. FIG. 6B shows a schematic illustration of the measurement setup FIGS. 6C-6E show schematic illustrations and digital photographs of alternative measurement setups that are also amenable to driving overall desalination by pumping at least two types of ions of oppositely signed charge without performing redox reactions.

The EPIIR pumping mechanism was validated by measuring the output ionic open-circuit voltage, $V_{out}$, for various input signals. The EPIIR has 40 nm diameter pores and the aqueous solution is 1 mM KCl. Unless stated otherwise, the input electric signals $V_c(t)$ are square waves at a frequency of 100 Hz, with a low voltage level of –0.2 V, and a high voltage level at 0.2 V. The ratchet input signal was produced with an HP 3245A universal source and the voltage between the Ag/AgCl wires was measured with an Agilent 34401A multimeter where both instruments shared the same ground. The voltage measurement was conducted with an integration time of 1.67-3.0 seconds to reduce the output signal oscillations and obtain only a net voltage. The response to every input signal was measured for 5 min after which the input was set to 0 V for 5 minutes. FIG. 7A shows the recorded ionic open-circuit voltage for duty cycles between 5% and 100% (the duty cycle is the portion of the time in every period where the voltage is at its high value). The input signal duty cycle is indicated on the plot. Once a ratchet signal commences, the output ionic open-circuit voltage quickly builds up to a level determined by the duty cycle. The ratchet induced voltage reaches its largest values for duty cycles close to 50%, i.e. a temporally averaged input voltage of 0 V. For a duty cycle of 100%, which is the response to a voltage step from 0 V to 0.2 V, the voltage signal shows fast capacitive charging behavior corresponding to polarization of the membrane. However, unlike the response to a duty cycle of 100%, which is a step function at 0.2 V, for a duty cycle of 95%, which is a modulated input signal with a temporal average voltage of 0.19 V, the ionic voltage is negative and with a much slower decay over time. This provides a simple distinction between near-steady-state ratchet-powered ion transport and capacitive charging-discharging behavior.

Figure 3B:
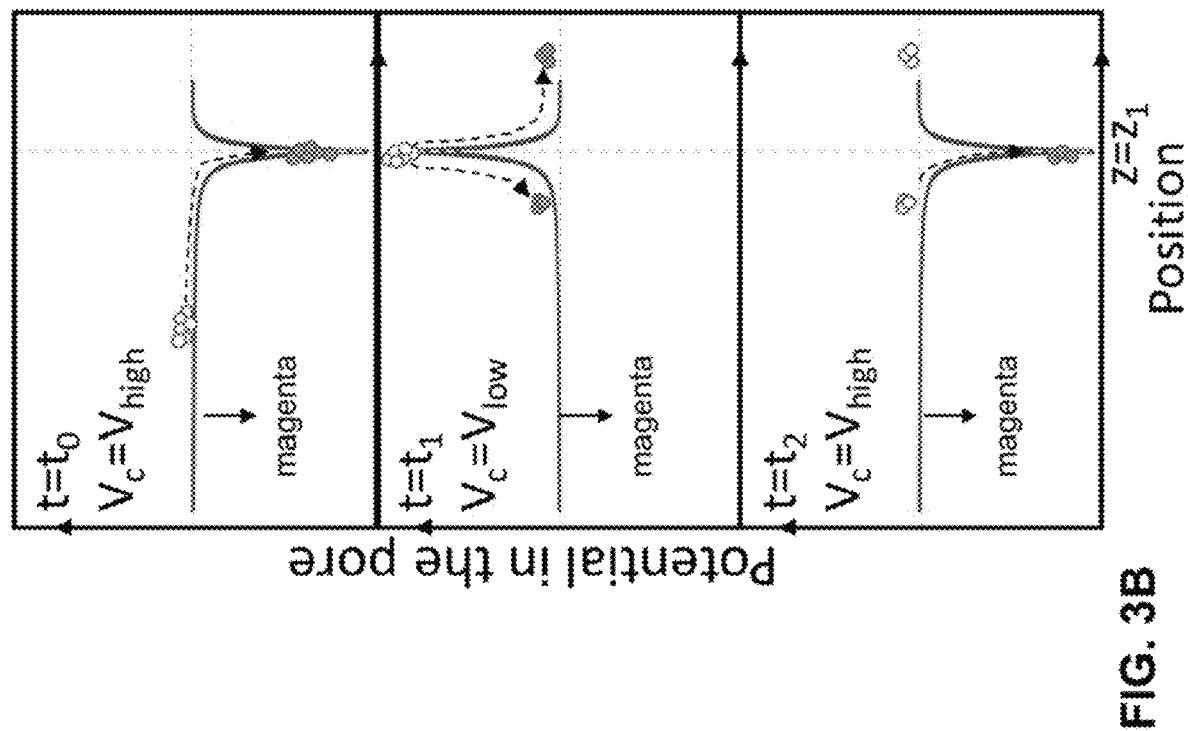
Figure 3A:
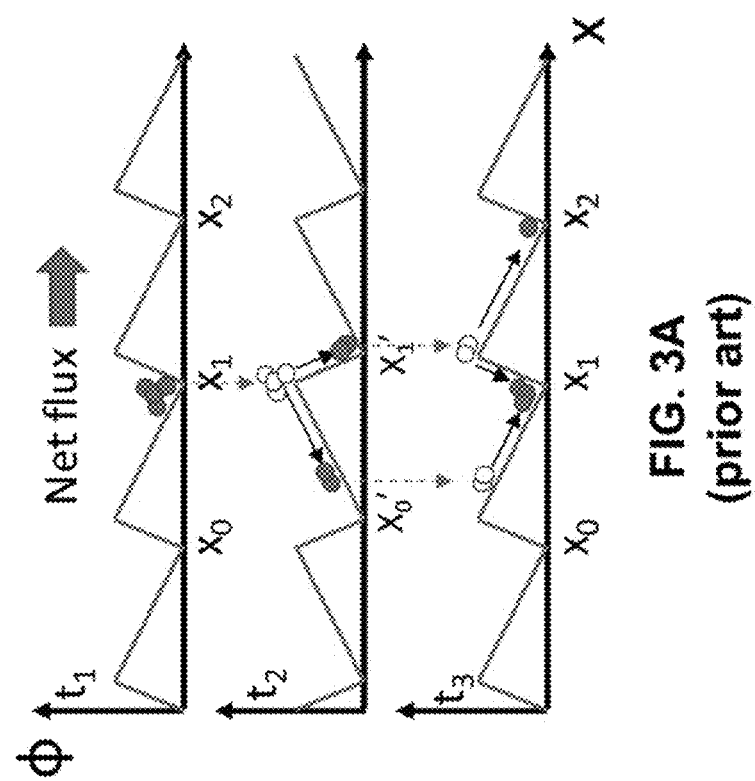

To estimate the EPIIR output ionic open-circuit voltage, the recorded voltage was averaged over the last 2.5 minutes of every cycle and the difference between the ratchet ON and ratchet OFF average voltages was calculated. FIG. 7B shows the EPIIR output ionic open-circuit voltage as a function of the input signal amplitude (peak to peak) for aqueous 1 mM KCl and aqueous 10 mM KCl solutions. The input signal was a square wave with a voltage offset of 0 V, frequency of 100 Hz and a duty cycle of 50%. For the 1 mM KCl solution, a noticeable EPIIR output is visible for ratchet signals with an amplitude as small as 0.1 V peak to peak. The EPIIR output is significantly smaller in the 10 mM KCl solution. Without wishing to limit the present invention to any theory or mechanism, at a higher ion concentration, the solution ions better screen the input signal and as a result, the center of the pore is less affected by the input signal and serves as a shunt. FIGS. 7C-7D show the EPIIR output ionic open-circuit voltage as a function of the frequency and duty cycle in 1 mM and 10 mM KCl, respectively. Since ratchet systems have no output when a constant voltage is applied, the EPIIR output ionic voltage is dose to 0 V for duty cycles near 0% and 100%. Similarly, at low frequencies, the EPIIR fully charges and discharges the double layers, which is similar to operation under a constant bias. Thus, the output is near 0 V at low frequencies as well. As a result, the EPIIR shows a significant output only when operated with duty cycles near 50% and at input signal periods that are close to the characteristic charging-discharging time constant of the EPIIR. When the input signal period is significantly shorter than the EPIIR charging and discharging time constants the output goes to zero again. Since higher salinity results in lower solution resistivity and shorter time constants, the optimal frequency for the 10 mM solution is higher than for the 1 mM solution. The optimal duty cycle is determined by the geometry of the system and the input signal properties. For example, in a system where the input signal modulation results in a potential alteration as shown in FIG. 3A, the amplitude and the sign of the output ionic current and voltage will be determined by the input signal duty cycle.

The observation of a net ionic voltage means that the ratcheting process alters the equilibrated condition of the cell to one that can perform useful work. In order to do this, the voltage that is generated must be used. One way to do this is to provide a low-impedance electron-transport pathway between the two Ag/AgCl ionic voltage-sensing electrodes such that net ionic current can flow via intermediate electronic current generated by redox reactions at the electrodes. Doing this results in analogous data to that reported for the ionic open-circuit voltage measurements above, as seen in FIG. 8A, but instead for ionic short-circuit current, as seen in FIG. 8B. The cause of the observation of a net ionic open-circuit voltage and short-circuit current is unclear based on the bulk time-averaged results, but is apparent from individual periods of ionic voltage (FIG. 8C) and ionic current (FIG. 8E), which also clearly illustrate the asymmetry and signal observed on longer time-averaged data (FIGS. 8D, 8F).

Device Configurations

Stacked EPIIRs

Porous alumina wafers provide a simple substrate that can be used to fabricate EPIIRs. The high mechanical, chemical and thermal robustness of alumina wafers enable the use of a suite of deposition techniques for the fabrication of full devices. Furthermore, anodic aluminum oxide (AAO) wafers can be purchased that have nominal pore diameters ranging from 10 nm to 250 nm making them compatible with electrolyte solutions having a wide range of conductivities. For these reasons, initial studies focused on EPIIRs based on AAO substrates. The initial simplest devices to be tested are single EPIIRs fabricated by depositing thin conductive metal layers on both sides of the MO wafer. FIG. 9A shows a schematic illustration for such a device.

While AAO wafers serve as good EPIIR substrates, other materials, for example polymers with sub-micron pores, can be used as well. In other embodiments, similar structures are formed by depositing metal layers with sub-micron pores on the two sides of an ion selective material such as Nafion®. Such configurations may have higher ionic conductivity and selectivity and they may be more efficient since the entire ion conducting phase is biased directly and not through fringing fields as in EPIIRs described below. Pores in the metal layers allow the ions to be easily transported in and out of the device.

The EPIIR efficiency can be increased further by using a combination of an ion selective material such a Nafion as the ion transport layer, and a mixed electronic and ionic conductor such as salts of poly(3,4-ethylenedioxythlophene) or a composite material as non-limiting examples of the conductive layer.[40] Such a configuration allows the entire surface of the EPIIR to be active instead of just the pores in the AAO wafer or in the electronically conductive layer described above.

Flashing ratchet devices include periodic structures with asymmetric electric potential distribution profiles. A similar configuration can be adopted to EPIIRs by stacking several EPIIR structures on top of a porous substrate. The EPIIRs stack can be fabricated by sequential deposition of conductive and dielectric layers for example with thermal or electron beam evaporation, sputtering, atomic layer deposition, among others. An asymmetric, saw-tooth like electric potential distribution is obtained by alternating the thickness of the dielectric layers between two values. FIG. 9B shows a schematic illustration of a stacked EPIIR and FIG. 9C shows a schematic representation of the electric potential distribution within the pore of this a device. The fine control of the thickness of the EPIIRs in this configuration holds a very important advantage. Since the absolute amount of ions within the pore depends on the EPIIR thickness, thinner EPIIRs will have less charge within the pores thus the input potential will not be easily screened by the ions within the pore. As a result, thinner EPIIRs will be able to pump ions in higher concentration solutions. By connecting different metal layers to different power sources, the potential within the pore can be controlled with more degrees of freedom resulting in a reversible ratchet. In these EPIIRs charge will not disperse in both directions upon potential switching and as a result, their efficiency can be dramatically higher than that of irreversible ratchets in which the charged particles disperse forward and backward upon potential switching.[26] FIG. 9D shows an illustration of an EPIIR that can operate as a reversible ratchet and FIG. 9E shows schematically the spatial electric potential distribution within its pores.

Semiconducting EPIIRs

Undoped and lightly doped semiconducting EPIIRs offer two fundamental advantages: They can be operated optically, and formed junctions can be used to fine tune the electric potential distribution within pores. High aspect ratio pores can be etched with photoelectrochemical etching[41] and with low temperature inductive coupled plasma etching.[42] FIG. 10 shows a schematic illustration of semiconducting EPIIR made of silicon with junction formations within it to fine tune the electric potential distribution within the pore.

Integrated Devices

Water deionization devices based on EPIIRs and semiconducting EPIIRs can be constructed with interdigitated devices as shown below. Besides water desalination, ion pumps and deionization devices can be used for a range of different applications. For example, since different ions are expected to have a different frequency response, such devices can be used for chemical separations. Devices based on EPIIRs can have improved functionality if integrated together or coupled with ion selective materials, for example, by depositing a cation-exchange membrane or an anion-exchange membrane on top of EPIIRs to produce an ion-selective pump.

Electrodialysis and capacitive deionization systems are hindered by large series resistance losses. To reduce these losses, there need to design a water deionization system that minimizes the distance that pairs of oppositely charged ions need to travel, constituting ions that are actively pumped and those neutralizing counter ions that together constitute a net chemical reaction and even energy storage. In one embodiment, this distance can be minimized by fabricating interdigitated EPIIRs. These EPIIRs include two sets of interlaced metal contact fingers, each set connected to different pores. Then, by supplying the two sets of contacts with opposite input signals, each set of pores can pump ions in different directions. Cation-exchange membrane and anion-exchange membrane materials are deposited on top of the two sets of contacts making each of the sets selective to either cations or anions. Hence, both types of charged ions can be pumped in a unidirectional manner from one side of the EPIIR to the other. Photolithography can be used to reduce to minimum the distance between the cation and anion pores potentially removing series resistance losses. FIGS. 11A-11B shows a schematic illustration of the interdigitated EPIIR. The top view (FIG. 11A) shows the contact fingers and the cation-exchange membrane and the anion-exchange membrane deposited on top of which. FIG. 11B is an illustration of ion transport through two adjacent contact fingers. The aforementioned example is but one configuration that can achieve said objective of reducing losses, and it is understood that the present invention is not limited to said embodiment.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

REFERENCES

1. Nam, D.-H., Lumley, M. A. & Choi, K.-S. A Desalination Battery Combining $Cu_3[Fe(CN)_6]_2$ as a Na-Storage Electrode and Bi as a Cl-Storage Electrode Enabling Membrane-Free Desalination. *Chem. Mater.* 31, 1460-1468 (2019).
2. Nam, D. H. & Choi, K. S. Bismuth as a New Chloride-Storage Electrode Enabling the Construction of a Practical High Capacity Desalination Battery. *J. Am. Chem. Soc.* 139, 11055-11063 (2017).
3. Lovreček, B., Despić, A. & Bockris, J. O. M. Electrolytic junctions with rectifying properties. *Journal of Physical Chemistry* 63, 750-751 (1959).
4. Ordinario, D. D. et al. Bulk protonic conductivity in a cephalopod structural protein. *Nat. Chem.* 6, 596-602 (2014).
5. Zhong, C. et al. A polysaccharide bioprotonic field-effect transistor. *Nat Commun.* 2, 1-5 (2011),
6. Siwy, Z, & Fuliński, A. Fabrication of a Synthetic Nanopore Ion Pump. *Phys. Rev. Lett.* 89, 4-7 (2002).
7. Siwy, Z. & Fuliński, A. A nanodevice for rectification and pumping ions. *Am. J. Phys.* 72, 567-574 (2004).
8. Zhang, Z. et al. "Uphill" cation transport: A bioinspired photo-driven ion pump. *Sci. Adv.* 2, e1000089 (2016).
9. Huang, X., Kong, X. Y., Wen, L. & Jiang, L. Bioinspired Ionic Diodes: From Unipolar to Bipolar. *Adv. Funct. Mater.* 28, (2018),
10. James, T. et al. Voltage-gated ion transport through semiconducting conical nanopores formed by metal nanoparticle-assisted plasma etching. *Nano Lett* 12, 3437-3442 (2012).
11. Sanborn, C. D., Chacko, J. V., Digman, M. & Ardo, S. Interfacial and Nanoconfinement Effects Decrease the Excited-State Acidity of Polymer-Bound Photoacids. *Chem* 5, 1648-1670 (2019).
12. White, W., Sanborn, C. D., Reiter, R. S., Fabian, D. M. & Ardo, S. Observation of Photovoltaic Action from Photoacid-Modified Nafion Due to Light-Driven Ion Transport. *J. Am. Chem. Soc.* 139, 11726-11733 (2017).
13. White, W., Sanborn, C. D., Fabian, D. M. & Ardo, S. Conversion of Visible Light into Ionic Power Using Photoacid-Dye-Sensitized Bipolar Ion-Exchange Membranes. *Joule* 2, 1-16 (2017).
14. Ardo, S. et al. Light-Driven Ion-Pumping Membrane Systems. US20180065095 A1 (2018).
15. Ardo, S. et al. Systems and Methods for Integrated Solar Photodialysis. PCT Int. Pat. Appl. 16/367,102 (2019).
16. Xiao, K. et al. Artificial light-driven ion pump for photoelectric energy conversion. *Nat. Commun.* 10, 74 (2019).
17. Wang, L. et al. Light-Driven Active Proton Transport through Photoacid- and Photobase-Doped Janus Graphene Oxide Membranes, *Adv. Mater.* 31, 903029 (2019).
18. Xie, X., Crespo, G. A., Mistlberger, G. & Bakker, E. Photocurrent generation based on a light-driven proton pump in an artificial liquid membrane. *Nat. Chem.* 6, 202-207 (2014).
19. Hänggi, P. & Marchesoni, F. Artificial Brownian motors: Controlling transport on the nanoscale. *Rev. Mod. Phys,* 81, 387-442 (2009).
20. Astumian, R. D. Thermodynamics and kinetics of a Brownian motor. *Science* 276, 917-922 (1997).
21. Reeling, E. M. et al. Organic electronic ratchets doing work. *Nat. Mater,* 10, 51-55 (2011).
22. Lau, B., Kedem, O., Schwabacher, J., Kwasnieski, D. & Weiss, E. A. An introduction to ratchets in chemistry and biology, *Mater. Horizons* 4, 310-318 (2017).
23. Kedem, O., Lau, B & Weiss, E. A. How to Drive a Flashing Electron Ratchet to Maximize Current. *Nano Lett,* 17, 5848-5854 (2017).
24. Kedem, O., Lau, B. & Weiss, E. A. Mechanisms of Symmetry Breaking in a Multidimensional Flashing Particle Ratchet. *ACS Nano* 11, 7148-7155 (2017).
25. Tarlie, M. B. & Astumian, R D. Optimal modulation of a Brownian ratchet and enhanced sensitivity to a weak external force. *Proc. Natl. Acad. Sci.* 95, 2039-2043 (2002).
26. Parrondo, J. M. R., Blanco, J. M., Cao, F. J. & Brito, R. Efficiency of Brownian motors. *Europhys. Lett.* 43, 248-254 (1998).
27. Kedem, O., Lau, B., Ratner, M. A. & Weiss, E. A. Light-responsive organic flashing electron ratchet. *Proc. Natl. Acad. Sci.* 114, 8698-8703 (2017).
28. Kedem, N. et al. Light-Induced Increase of Electron Diffusion Length in a p-n Junction Type $CH_3NH_3PbBr_3$ Perovskite Solar Cell. *J. Phys. Chem. Lett.* 6, 2469-2476 (2015).
29. Squires, T. M. Induced-charge electrokinetics fundamental challenges and opportunities †. 3, 2477-2483 (2009).
30. Jung, P. Regular and Chaotic Transport in Asymmetric Periodic Potentials: Inertia Ratchets. 18-21 (1996).
31. Rozenbaum, V. M. High-temperature brownian motors: Deterministic and stochastic fluctuations of a periodic potential. *JETP Lett.* 88, 342-346 (2008).
32. Lau, B. & Kedem, O. Electron ratchets: State of the field and future challenges. *J. Chem. Phys.* 152, 200901 (2020).
33. Hänggi, P. & Marchesoni, F. Artificial Brownian motors: Controlling transport on the nanoscale. *Rev. Mod Phys.* 81, 387-442 (2009).
34. Mei, L., Yeh, L. H. & Qian, S. Gate modulation of proton transport in a nanopore. *Phys. Chem. Chem. Phys.* 18, 7449-7458 (2016).
35. Van Toan, N., Inomata, N., Toda, M. & Ono, T. Ion transport by gating voltage to nanopores produced via metal-assisted chemical etching method. *Nanotechnology* 29, (2018).
36. Wu, S., Wildhaber, F., Bertsch, A., Brugger, J. & Renaud, P. $Al_2O_3$/W hetero-structured nanopore membranes: From native to tunable nanofluidic diodes. *8th Annu. IEEE Int. Conf. Nano/Micro Eng. Mol. Syst. IEEE NEMS* 2013 1, 998-1001 (2013).
37. Yeh, L. H., Ma, Y., Xue S. & Qian, S. Gate manipulation of ionic conductance in a nanochannel with overlapped electric double layers. *Sensors Actuators, B Chem.* 215, 266-271 (2015).
38. Guan, W., Fan, R. & Reed, M. A. Field-effect reconfigurable nanofluidic ionic diodes. *Nat. Common.* 2, 506-508 (2011).

39. Guan, W., Li, S. X. & Reed, M. A. Voltage gated ion and molecule transport in engineered nanochannels: Theory, fabrication and applications. Nanotechnology 25, (2014).
40. Rivnay, J. et al. Structural control of mixed ionic and electronic transport in conducting polymers. *Nat. Commun.* 7, 1-9 (2016).
41. Lehmann, V. The Physics of Macropore Formation in Low Doped n-Type Silicon. *J. Electrochem. Soc.* 140, 2836 (1993).
42. Liu, Z., Gu, X., Hwu, J., Sassolini, S. & Olynick, D. L. Low-temperature plasma etching of high aspect-ratio densely packed 15 to sub-10 nm silicon features derived from PS-PDMS block copolymer patterns. *Nanotechnology* 25, (2014).

What is claimed is:

1. An ion transport structure (110) comprising an ion-permeable layer (112) coupled to at least two contacts (122), wherein the ion transport structure (110) is configured to transport ions across the ion-permeable layer (112) when a spatially asymmetric electric potential distribution is temporally modulated to change electric fields within the ion transport structure, resulting in a ratchet-driven ion pump.

2. The ion transport structure (110) of claim 1, wherein the spatially asymmetric electric potential distribution is temporally modulated by application of a stimulus or perturbation to the structure to alter the electric fields.

3. The ion transport structure (110) of claim 2, wherein the stimulus or perturbation is an electrical bias, light, a temperature gradient, or a pH gradient.

4. The ion transport structure (110) of claim 3, wherein the ion transport structure is configured to continuously transport ions using alternating electronic polarization, wherein the ion transport structure (110) pumps ions with minimized resistance and without using electrochemical reactions or mechanical forces.

5. The ion transport structure (110) of claim 1, wherein the ion-permeable layer comprises a dielectric material, a semiconductor, a polymer, or an ion-selective material.

6. The ion transport structure (110) of claim 1, wherein the contact (122) is a layer or wire comprised of an electrically conductive material.

7. The ion transport structure (110) of claim 1, wherein a plurality of channels (115) is disposed through the ion transport structure (110).

8. A method of moving ions in a solution, said method comprising:
   a. providing the ion transport structure (110) of claim 1;
   b. placing the ion transport structure (110) in the solution; and
   c. temporally modulating a spatially asymmetric electric potential distribution to change electric fields within the ion transport structure to transport ions across the ion-permeable layer (112).

9. An ion transport structure (110) comprising a plurality of ion-permeable layers (112) and a plurality of contacts (122) forming a stack in which the ion-permeable layers (112) alternate with the plurality of contacts (122), wherein the ion transport structure (110) is configured to transport ions through the stack when a spatially asymmetric electric potential distribution is temporally modulated to change electric fields within the ion transport structure, resulting in a ratchet-driven ion pump.

10. The ion transport structure (110) of claim 9, wherein a plurality of channels (115) is disposed through the stack of alternating layers.

11. An ion pumping system (100) comprising:
   a. an ion transport structure (110) comprising an ion-permeable layer (112) and at least two contacts (122) coupled to the ion-permeable layer (112);
   b. a first ion-selective membrane (130) operatively coupled to the ion transport structure (110); and
   c. a second ion-selective membrane (135) operatively coupled to the ion transport structure (110);
      wherein the first ion-selective membrane (130) and the second ion-selective membrane (135) are each selective for ions having a specific charge, wherein the ions are transported across the ion transport structure (110) and the second ion-selective membrane (135) when a spatially asymmetric electric potential distribution is temporally modulated to change electric fields within the ion transport structure, resulting in a ratchet-driven ion pump.

12. The ion pumping system (100) of claim 11, wherein the spatially asymmetric electric potential distribution is temporally modulated by application of a stimulus or perturbation to the structure to alter the electric fields.

13. The ion pumping system (100) of claim 12, wherein the stimulus or perturbation is an electrical bias, light, a temperature gradient, or a pH gradient.

14. The ion pumping system (100) of claim 11, wherein the ion transport structure is configured to continuously transport ions using alternating electronic polarization, wherein the ion transport structure (110) pumps ions with minimized resistance and without using electrochemical reactions or mechanical forces.

15. The system (100) of claim 11, wherein the first ion-selective membrane is disposed on the ion transport structure and the second ion-selective membrane (135) is attached to the ion transport structure (110) such that the second ion-selective membrane (135) and ion transport structure (110) are side by side.

16. The system (100) of claim 11, wherein a plurality of channels (115) is disposed through the ion transport structure (110).

17. The system (100) of claim 16, wherein the at least two contacts (122) comprise two sets of interlaced contact fingers, each set connected to different channels, wherein a first set of strips comprising the first ion-selective membrane (130) are disposed on one set of contact fingers and a second set of strips comprising the second ion-selective membrane (135) is dispose on the other set of contact fingers such that the strips of the first ion-selective membrane (130) alternate with the strips of the second ion-selective membrane (135), wherein each set of contact fingers has a corresponding set of interlaced contact fingers disposed on the second surface (116) of the ion-permeable substrate and connected to the same channels, thereby forming a paired set, wherein each paired set is connected to its own separate power source.

18. A deionization system for moving ions in a solution from a first compartment to a second compartment, comprising the ion pumping system (100) of claim 11, wherein the ion pumping system separates the first and second compartment,
   wherein each compartment contains the solution having an initial concentration of ions, wherein when a spatially asymmetric electric potential distribution is temporally modulated to change electric fields within the ion transport structure, resulting in a ratchet mechanism, ions from the first compartment are selectively transported in one direction across the ion pumping system, thereby increasing the ion concentration in the second compartment and reducing the ion concentration in the first compartment.

19. The desalination system of claim 18, wherein the first ion selective membrane (130) is disposed on the ion transport structure (110) and the second ion-selective membrane (135) is attached to the ion transport structure (110) to form a single, continuous barrier that separates the first and second compartment.

20. The desalination system of claim 18, wherein the first ion selective membrane (130) is disposed on the ion transport structure (110), wherein the second ion-selective membrane (135) and the ion transport structure (110) are disconnected, and each one forms a barrier that separates the first and second compartment.

* * * * *